(12) United States Patent
Aldaz

(10) Patent No.: US 6,754,252 B1
(45) Date of Patent: Jun. 22, 2004

(54) METHOD AND APPARATUS FOR CALL DROP PREVENTION IN A WIRELESS COMMUNICATION SYSTEM

(75) Inventor: Luis Aldaz, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 667 days.

(21) Appl. No.: 09/678,471

(22) Filed: Oct. 2, 2000

(51) Int. Cl.$^7$ ............................................... H04B 1/707
(52) U.S. Cl. ....................................... 375/148; 375/144
(58) Field of Search ................................ 375/144, 148; 370/320, 335, 342

(56) References Cited

U.S. PATENT DOCUMENTS

| | | | | |
|---|---|---|---|---|
| 5,490,165 A | | 2/1996 | Blakeney, II et al. | ....... 375/205 |
| 6,072,807 A | * | 6/2000 | Daudelin | .................... 370/465 |
| 6,370,183 B1 | * | 4/2002 | Newson et al. | ............. 375/144 |
| 6,515,977 B2 | * | 2/2003 | Bi et al. | ...................... 370/342 |
| 6,574,483 B1 | * | 6/2003 | Amerga | ...................... 455/517 |
| 6,600,777 B1 | * | 7/2003 | Glazko | ........................ 375/148 |

\* cited by examiner

*Primary Examiner*—Young T. Tse
(74) *Attorney, Agent, or Firm*—Peter Zawilski

(57) ABSTRACT

A method and apparatus for preventing dropped calls in a wireless communication device. In one embodiment, the present invention is comprised of a method including the step of determining a characteristic of a first finger. Next, the present embodiment compares a characteristic of the first finger to a characteristic threshold. In this embodiment, provided the characteristic of the first finger does not meet the characteristic threshold, the present invention then determines if a second finger is present. Provided it is determined that a second finger is not present, the present invention prevents the first finger from being deassigned such that the first finger is not deassigned when only the first finger is present. In so doing, the present embodiment ensures that first finger is utilized (i.e. not dropped) even when the first finger does not meet a given characteristic threshold.

15 Claims, 15 Drawing Sheets

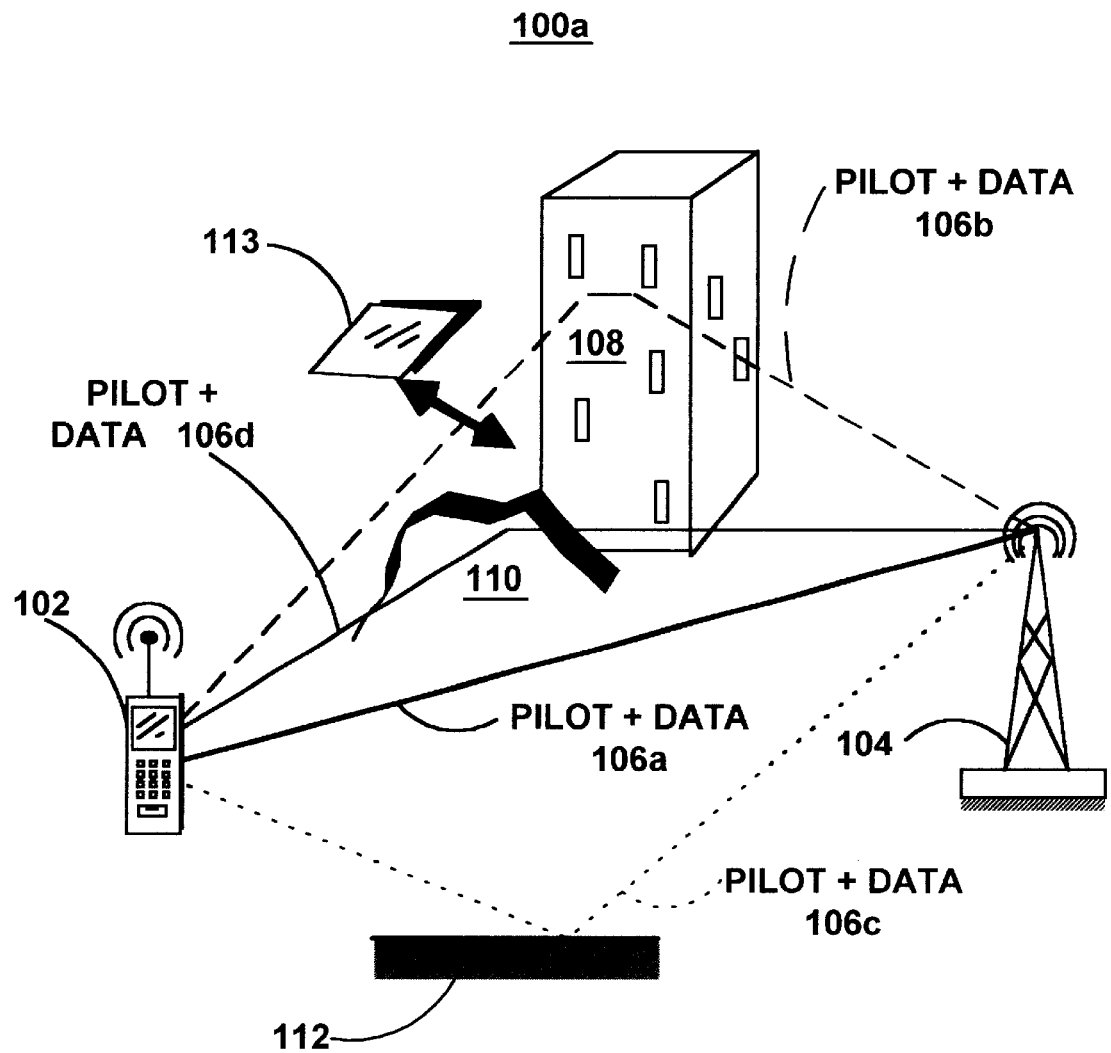
Prior Art FIG. 1A

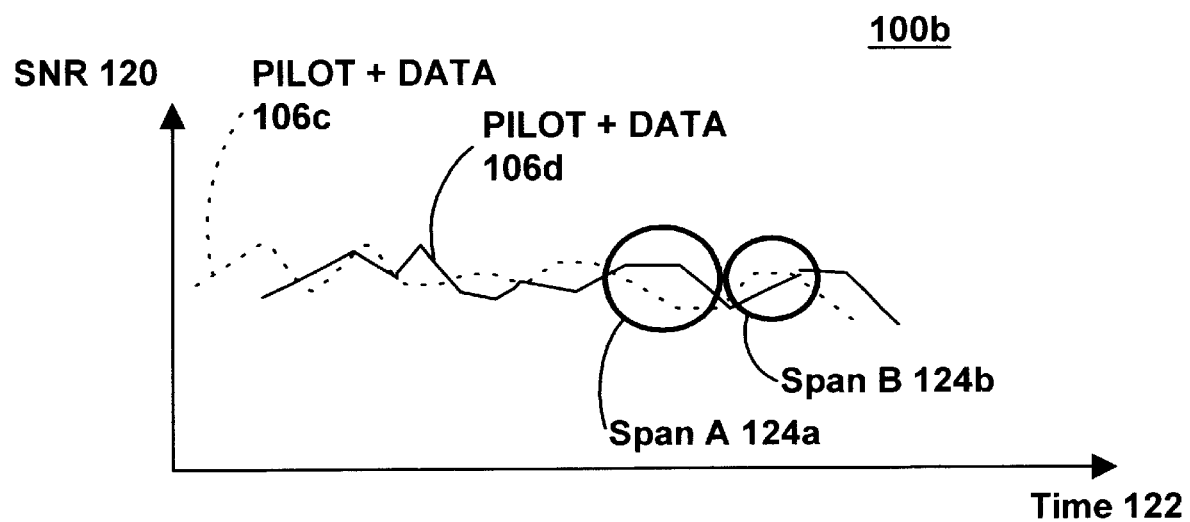
Prior Art FIG. 1B

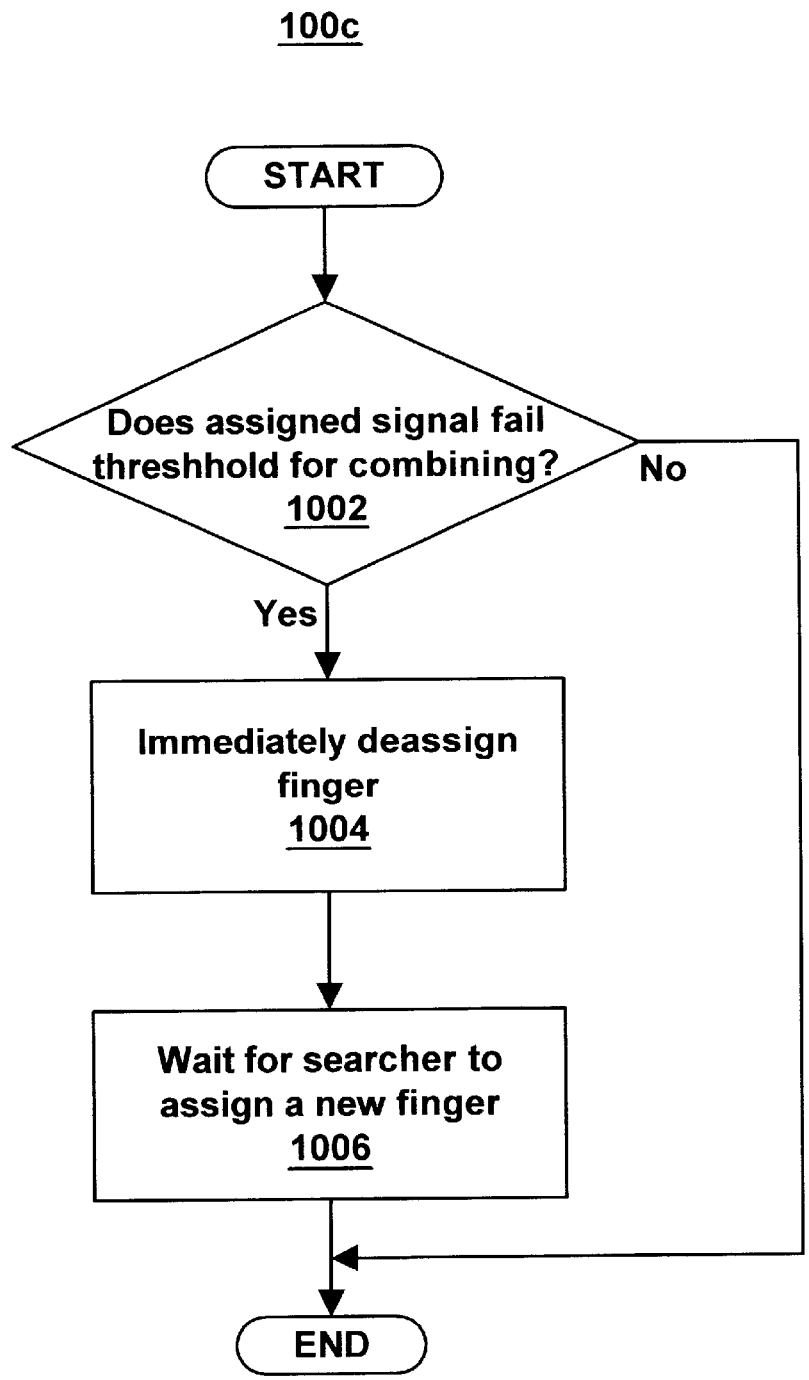
Prior Art FIG. 1C

METHOD AND APPARATUS FOR CALL DROP PREVENTION IN A WIRELESS COMMUNICATION SYSTEM

TECHNICAL FIELD

The present claimed invention relates to the field of digital communication. Specifically, the present claimed invention relates to an apparatus and a method for managing and locking fingers used to receive multipath signals.

BACKGROUND ART

Wireless telephony, e.g. cellular phone use, is a widely-used mode of communication today. Variable rate communication systems, such as Code Division Multiple Access (CDMA) spread spectrum systems, are among the most commonly deployed wireless technologies. Because of increasing demand and limited resources, a need arises to improve their capacity, fidelity, and performance.

Referring to prior art FIG. 1A, an illustration of multipath signal propagation between a conventional base station and a cell phone is shown. A conventional base station 104 transmits a signal to a mobile station, e.g., phone, 102. Typically, the signal contains pilot information, that identifies the base station, and data information, such as voice content. A signal that can be transmitted directly to mobile phone 102 without interference, such as first signal 106a, provides the strongest signal. However, given the power limitations at which base station 104 can transmit the signal, and given the noise a signal may pick up, a need arises to improve the power and the SNR of the signal received at mobile phone.

Conventional methods will combine the portions of the transmitted signal that travel different paths to mobile unit 102. The multiple paths arise because of natural and man-made obstructions, such as building 108, hill 110, and surface 112, that deflect the original signal. Because of the paths over which these other signals travel, a time delay and performance deterioration intrinsically arises in the synchronization-sensitive and noise-sensitive data transmitted from base station 104 to mobile phone 102. However, to provide the strongest possible signal to a mobile phone, two or more of the signals from these multiple paths, e.g. path 106a–106d, may be combined. However, to efficiently combine and demodulate multipath signals, a need arises for a method to select the most worthwhile candidates from all the different multipaths received in mobile phone.

Corruption of a transmitted signal falls into two general categories: slowly-varying channel impairment and fast fading variation. Slowly-varying channel impairment arises from factors such as log-normal fading, or shadowing caused by movement or blocking as exemplified in prior art FIG. 1A, or slow fading. Slower variations, e.g., sub Hz, determine in effect, the "availability" of the channel. In contrast, only the fast fading variation affects the details of the received waveform structure and the interrelationships of errors within a message. Hence, a need arises for a method that effectively choose the properties of the signal that influence its condition for demodulation.

Referring now to prior art FIG. 1B, a graph of two conventional multipath signal strengths over time is shown. Graph 100b has an abscissa 122 of time and an ordinate of signal-to-noise ratio (SNR) 120, e.g. pilot Ec/Io ratio. Third multipath signal 106c and fourth multipath signal 106d are shown as exemplary multipath signals received at mobile phone 102. Conventional methods typically select for combining, the multipath signals with the highest SNR. Thus, at time span A 124a, the dark line representing fourth multipath signal 106d has a higher SNR level than third multipath signal 106c, assuming both signals have the same noise level. However, at time span B 124b, the dashed line representing third multipath signal 106c has a higher SNR level. Given the closeness of the SNR, or of the signal to noise ratio, of these two multipath signals, the choice as to which signal will be chosen for the demodulation finger can oscillate back and forth.

This oscillation is a condition known as "thrashing." The drawback with thrashing is that it consumes a significant amount of system resources, such as processor operations. During thrashing, the processor can be overloaded with operations that constantly assign and deassign the multiple fingers to different multipath signals. Furthermore, thrashing may degrade the quality of the mobile phone 102 output signal, as the switching may cause an audible interference or it may introduce latency effects. Consequently, a need arises for a method to select the best multipath signal for combining while avoiding the effect of thrashing.

Furthermore, referring again to prior art FIG. 1A, conventional methods combine transmitted signals that travel different paths to mobile unit 102. The multiple paths arise because of natural and man-made obstructions, such as building 108, hill 110, and surface 112, that deflect the original signal. Because of the paths over which these other signals travel, a time delay and performance deterioration intrinsically arises in the synchronization-sensitive and noise-sensitive data that is transmitted from base station 104 to mobile unit 102. To provide the strongest possible signal to a mobile unit, two or more of the signals from these multiple paths, e.g. path 106a–106d, may be combined.

Corruption of a transmitted signal falls into two general categories: slowly-varying channel impairment and fast fading variation. Slowly-varying channel impairment arises from factors such as log-normal fading, or shadowing caused by movement or blocking from objects, as shown in prior art FIG. 1A, or from slow fading. Slower variations, e.g., sub Hz, determine in effect, the "availability" of the channel. In contrast, only the fast fading variation affects the details of the received waveform structure and the interrelationships of errors within a message. Interference on a signal can be caused by moving objects that temporarily block the signal, such as moving object 113 that interferes with signal 106b of prior art FIG. 1A. Based upon the characteristic differences of these signals, a need arises for a method of capturing a signal while avoiding the detrimental characteristics of fast fading or short fading variation encountered at the receiving unit.

Referring now to FIG. 1C, a flowchart of a conventional process used for implementing fingers in a communication device is shown. Flowchart 100c begins with step 1002. In step 1002, an inquiry determines whether an assigned signal fails to meet a threshold for combining. If an assigned signal does fail to the single threshold, then flowchart 100c ends. If the assigned signal satisfies the threshold, then flowchart 100c ends. In step 1004, the finger assignment is immediately deassigned, e.g. because it failed to meet the threshold. Following step 1004, flowchart proceeds to step 1006. In step 1006, the communication device waits for the searcher to assign a new finger.

Prior art FIG. 1C presents several problems associated with the conventional management of assigned fingers. The first problem deals with thrashing. The second problem deals with unnecessary latency. In step 1002, the only criteria by which fingers are deassigned is a single threshold for combining the signal. This single threshold is shown in prior art FIG. 1B as threshold 126. By using only a single threshold, third multipath signal 106c is immediately deassigned, per step 1004, as soon as it fails threshold 126, e.g., at time 122a. Because of this limitation, one of the demodulating fingers must now wait for the searcher to identify a new multipath signal to be assigned, e.g., per step 1006. This latency is shown as the delay 128 between time 122a and 122b, where third pilot 106c is deassigned and second multipath signal 106b is assigned.

In a different scenario, if no other multipath signals are available for demodulation, and a demodulating finger is available, then second multipath signal 106b may be constantly assigned and deassigned from the given demodulating finger based on its performance. That is, second multipath signal 106b frequently crosses the threshold value, thereby causing the communication device to frequently assign, deassign, and reassign a multipath signal to a demodulating finger that has no other worthy candidate multipath signals. This phenomenon of frequent assigning and deassigning is referred to as "thrashing." Unfortunately, thrashing consumes a significant amount of system resources, such as CPU operations, by constantly performing tasks such as assigning and deassigning. Furthermore, thrashing may downgrade the quality of the output signal from the mobile unit 102. This is because the frequent changes in finger assignment, and its associated latency effects, may cause an perceptible degradation in the composite signal provided by the communication device to a user. Consequently, a need arises for a method of managing assigned fingers that avoids the problem of thrashing, and its associated side-effects.

As yet another drawback, some communication systems will deassign or drop fingers which do not meet a certain characteristic. For example, a finger which does not have a signal strength of a given threshold will be dropped. Similarly, a finger whose signal strength drops below a certain threshold for a given period of time may also be dropped. Unfortunately, such dropping of fingers often results in dropped communication links (e.g. telephone calls). That is, such threshold value testing may result in a cancelled or dropped telephone call.

Thus, an apparatus and a method are needed to improve the capacity, fidelity, and performance of digital communication is provided. More specifically, a need arises for a method and apparatus which does not deassign a finger based solely upon a comparison to a threshold value. Still another need exists for a method and apparatus which meets the above needs and which prevents a communication linked from being dropped.

DISCLOSURE OF THE INVENTION

The present invention provides an apparatus and a method which improves the capacity, fidelity, and performance of digital communication. Specifically, in one embodiment, the present invention provides a method and apparatus which does not deassign a finger based solely upon a comparison to a threshold value. The present embodiment further provides a method and apparatus which achieves the above accomplishments and which prevents a communication linked from being dropped.

Specifically, in one embodiment, the present invention is comprised of a method including the step of determining a characteristic of a first finger. Next, the present embodiment compares a characteristic of the first finger to a characteristic threshold. In this embodiment, provided the characteristic of the first finger does not meet the characteristic threshold, the present invention then determines if a second finger is present. Provided it is determined that a second finger is not present, the present invention prevents the first finger from being deassigned such that the first finger is not deassigned when only the first finger is present. In so doing, the present embodiment ensures that first finger is utilized (i.e. not dropped) even when the first finger does not meet a given characteristic threshold.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form part of this specification, illustrate embodiments of the invention and, together with the description, serve to explain the principles of the invention. The drawings referred to in this description should be understood as not being drawn to scale except as specifically noted.

PRIOR ART FIG. 1A is an illustration of multipath signal propagation between a conventional base station and a cell phone.

PRIOR ART FIG. 1B is graph of two conventional multipath signal strengths over time.

PRIOR ART FIG. 1C is a flowchart of a conventional process used for implementing fingers in a communication device.

Figure 2:
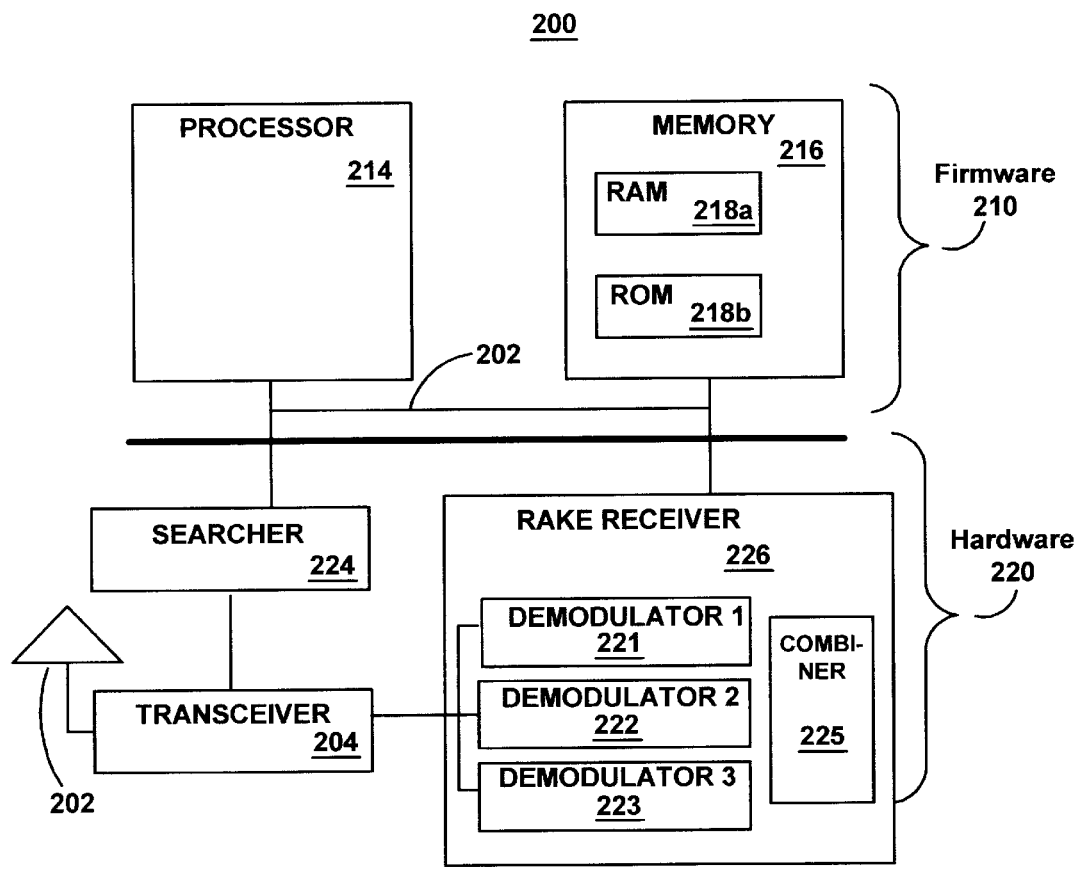
FIG. 2 is a block diagram of a communication device used to manages multipath signals, in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions which follow, e.g., the processes, are presented in terms of procedures, logic blocks, processing, and other symbolic representations of operations on data bits within a computer or digital system memory or on signals within a communication device. These descriptions and representations are the means used by those skilled in the digital communication arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "receiving," "acquiring," "determining," "categorizing," "evaluating," "providing," "enabling," or the like, refer to the action and processes of a communication device or a similar electronic computing device, that manipulates and transforms data. The data is represented as physical (electronic) quantities within the communication devices components, or the computer system's registers and memories, and is transformed into other data similarly represented as physical quantities within the communication device components, or computer system memories or registers, or other such information storage, transmission or display devices.

Referring now to FIG. 2, a block diagram of a communication device used to manages multipath signals is shown, in accordance with one embodiment of the present invention. Communication device 200, e.g., a mobile station or phone, includes two general sections of firmware 210 and hardware 220. Firmware section 210 includes processor 214 and memory 216, coupled to each other via bus 202.

Hardware section 220 of FIG. 2 includes an antennae 202, a transceiver 204, a searcher 224, and a rake receiver 226. The antennae is coupled to the transceiver 204 which in turn is coupled to rake receiver 226 and searcher 224. Searcher 224 and rake receiver 226 are both coupled to processor 214 and memory 216. Rake receiver 226 includes multiple demodulation paths, also known as demodulating fingers or demodulators, 221–223. Each finger 221–223 is coupled to transceiver 204 so that it may independently identify and demodulate its respective multipath signal based upon its time of arrival. Rake receiver is coupled to subsequent hardware, not shown in FIG. 2, that is well known in the art for further processing of the signals. The output of demodulating fingers are coherently combined by a diversity combiner 225 to produce maximum SNR. By using a combination of hardware 220 and firmware 210, the present invention provides efficient and flexible management of multipath signals for efficient use of demodulators, as described more fully hereinafter.

Figure 3:
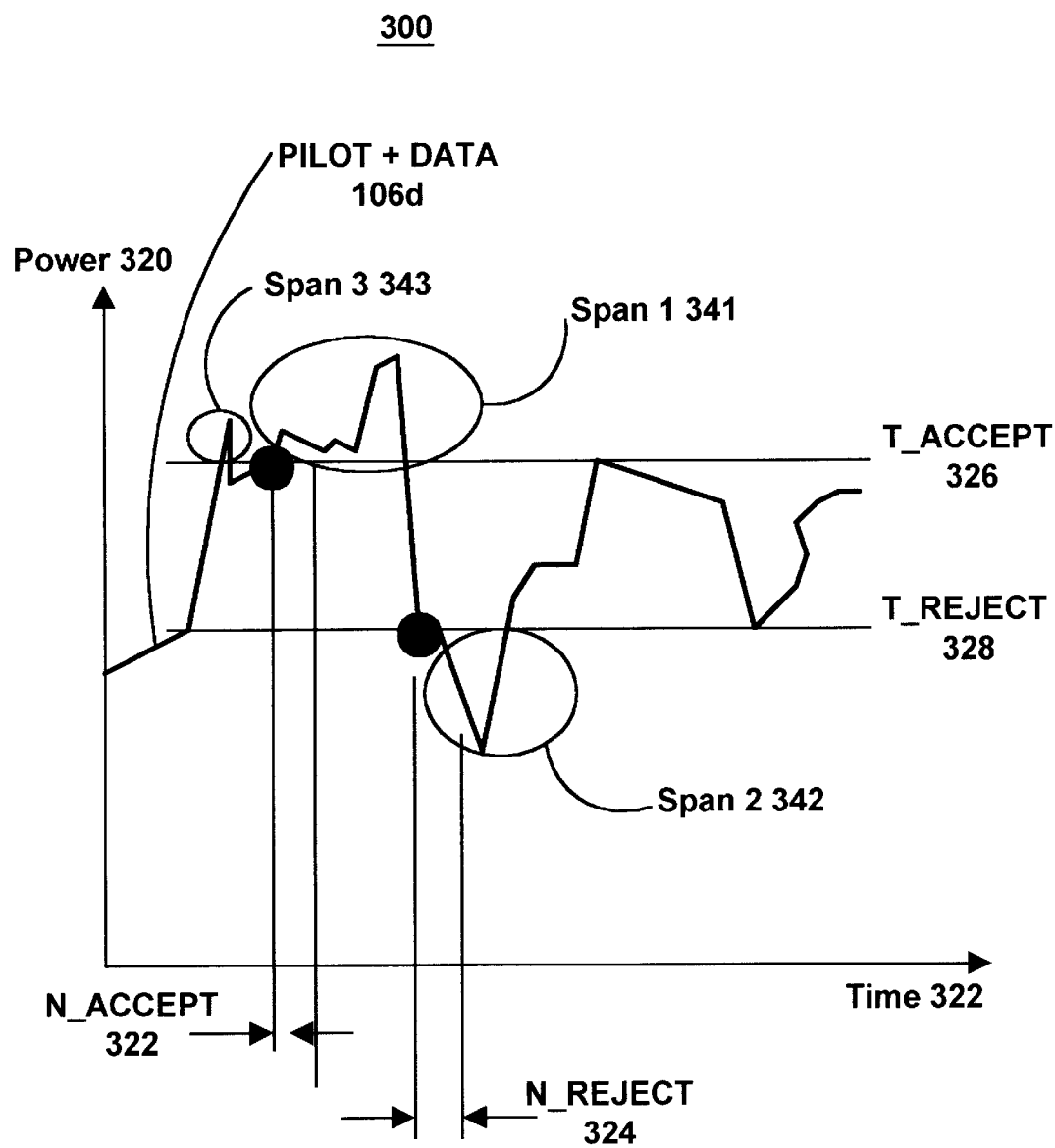
FIG. 3 is a graph of an exemplary multipath signal, to which a time threshold and a SNR threshold is applied, in accordance with one embodiment of the present invention.

Referring now to FIG. 3, a graph of an exemplary multipath signal, to which a time threshold and a SNR threshold is applied is shown, in accordance with one embodiment of the present invention. Graph 300 has an abscissa of time 322 and an ordinate of SNR 320, which can also be illustrative of signal power, assuming a constant noise level. Fourth multipath signal 106d is shown as an exemplary signal charted over a period of time. A first SNR threshold, multipath acceptance threshold (T_ACCEPT) 326, represents the threshold for which the multipath management will consider a multipath ACCEPT operation for the multipath signal in question. In conjunction with the T_ACCEPT 326 threshold, the present embodiment also shows the number threshold of measurement for acceptance (N_ACCEPT) 322 that represents a time threshold over which the signal-to-noise ratio of the signal must be maintained above T_ACCEPT wherein the signal strength of the multipath signal is above T_ACCEPT for N_ACCEPT consecutive times of searcher measurements. As shown in FIG. 3, fourth multipath signal 106d fails to satiate both these thresholds in time span 3 343. However, fourth multipath signal 106d does satiate both of these thresholds as shown in time span 1 341. While the present embodiment utilizes both a SNR threshold and a time threshold to consider a multipath ACCEPT operation for the multipath signal, the present invention is well-suited to using only a SNR threshold.

FIG. 3 also shows a second SNR threshold, multipath rejection threshold (T_REJECT) 328, which represents the threshold for which the multipath management will consider a REJECT operation for the multipath signal in question. In conjunction with the T_REJECT 328 threshold, the present embodiment also shows the number threshold of measurement for rejection (N_REJECT) threshold 324 that represents a time threshold over which the strength of the signal must be below T_REJECT for the multipath REJECT operation to proceed. As shown in FIG. 3, fourth multipath signal 106d satiates both these thresholds as shown by time span 2 342. By using a time threshold for accepting and/or rejecting a multipath signal with respect to the demodulation and combining operations, the present invention essentially provides a low pass filtering for the signal evaluation. By doing so, the present invention limits the rate of unnecessary assignment to noise signal and unnecessary deassignment of demodulating fingers from a perturbating but otherwise strong multipath signal without causing thrashing. While the present embodiment utilizes both a SNR threshold and a time threshold to consider a multipath ACCEPT operation for the multipath signal, the present invention is well-suited to using only a SNR threshold.

Figure 4:
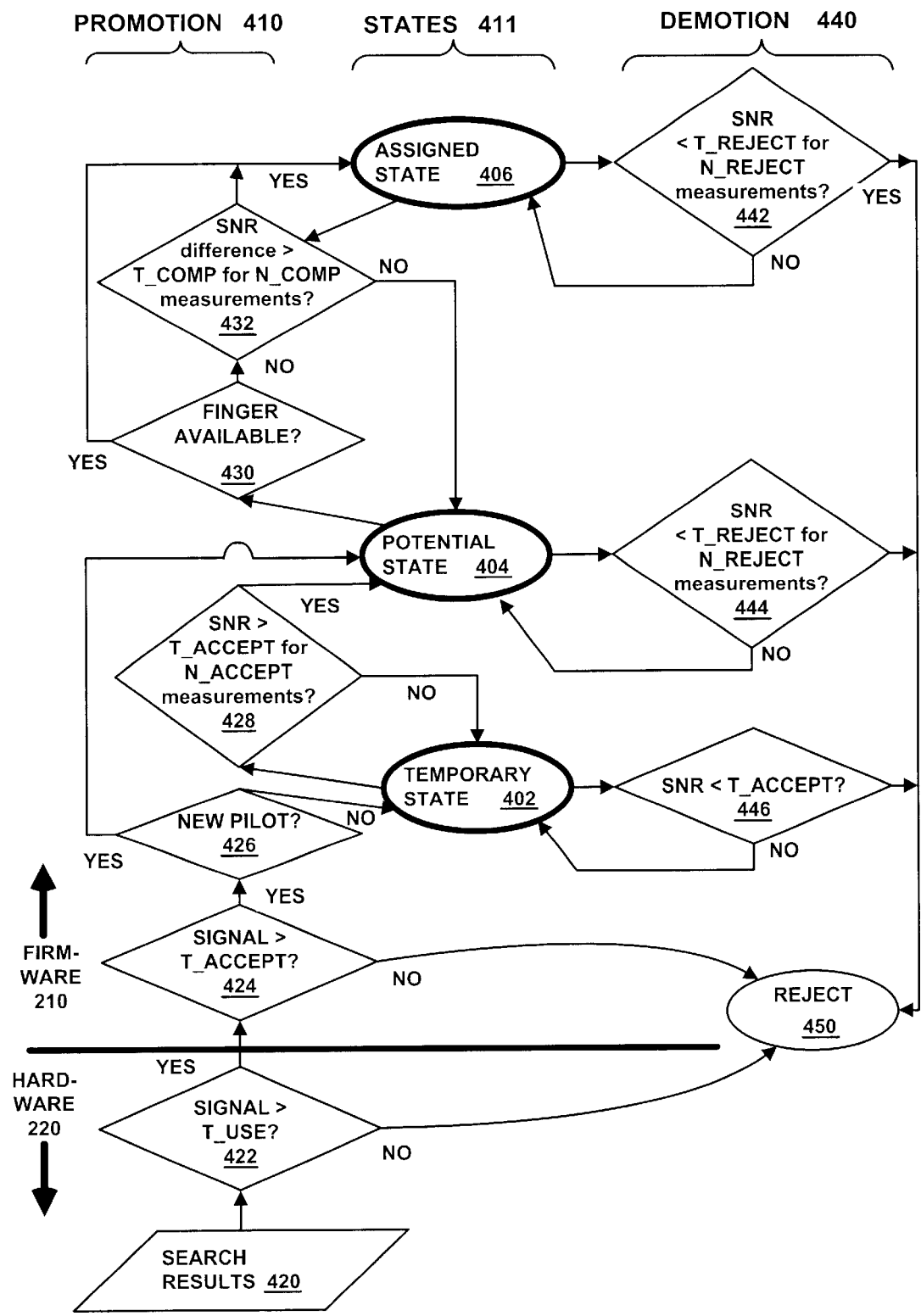
FIG. 4 is a state diagram in which multipath signals may be categorized, in accordance with one embodiment of the present invention.

FIG. 4 is a state diagram in which multipath signals may be categorized, in accordance with one embodiment of the present invention. State diagram 400 shows three states: a temporary state 402, a potential state 404, and an assigned state 406. These states are arranged in a hierarchy where temporary state 402 is the lowest state, potential state 404 is the next higher state, and assigned state 406 is the highest state. While the present embodiment shows three states, the present invention is well suited to using any number of states in any kind of hierarchy arrangement. In the present embodiment, a demodulating finger is assigned to each multipath signals categorized in assigned state and the multipath signal is enabled for demodulation. In contrast, the multipath signals categorized in any state other than assigned state are not enabled for demodulation, but can be maintained to evaluate performance over time, and thus provide future candidates for demodulation.

By having more multipath signals associated with the temporary or potential state, the present invention provides a ready supply of good-quality signals available for demodulation. This avoids some of the scheduling problems of finding a signal for an available demodulating finger, encountered in the prior art. Overall, the number of signals associated with all of the multiple states can greatly exceed the number of available demodulating fingers in a rake receiver. In this manner, the present invention provides a sequence of queues of available multipath signals that will compensate for a wide variety of signal problems.

FIG. 4 also shows how multipath signals are categorized, e.g. promoted and demoted, to and from specific states. The a column labeled promotion 420 provides a process whereby a multipath signal may be promoted to, or categorized as, a certain state. Conversely, a column labeled demotion 440 provides a process whereby a multipath signal may be demoted from a certain state. While the present embodiment provides a specific process for categorizing a signal with a state, the present invention is well suited to using a wide variety of processes and methods adaptable to specific applications.

The process of assigning a state for the present embodiment, shown in promotion column 420, starts with a searcher signal input 420 from a hardware portion 462 of a communication device. FIG. 2 provides one embodiment of hardware that implements input 420, where antennae 202 and transceiver 204 and searcher combine to provide a multipath signal (signal).

Step 422 of the present embodiment inquires whether the signal has a SNR that is greater than a predetermined threshold T_USE established by the searcher. The threshold T_USE guarantees sufficient signal strength for demodulation. If the signal does have a SNR that is greater than threshold T_USE, then the process proceeds to step 426. Alternatively, if the signal does not have a SNR that is greater than threshold T_USE, then the signal is rejected per step 450. The searcher measures an arrival time of the multipath signal with signal strength above T_USE. If the arrival time of the multipath signal does not match that of any of the multipath signals existing in the multipath list, the multipath signal is considered to be a new multipath signal.

Step 424 of the present embodiment inquires whether the new multipath signal has a SNR that is greater than a threshold T_ACCEPT. If the new multipath signal does have a SNR that is greater than threshold T_ACCEPT, then the process proceeds to step 426. Alternatively, if the new multipath signal does not have a SNR that is greater than threshold T_ACCEPT, then the new multipath signal is rejected per step 450.

Step 426 of the present embodiment inquires whether the new multipath signal is indeed a new pilot, e.g. a signal from a new base station having a new pilot identification. If the new multipath signal is a new pilot, then the process categorizes the new multipath signal to potential state 404. This special treatment for a new base station produces better cell diversity gain. Alternatively, if the new multipath signal is not a new pilot, then the process categorizes the new multipath signal to temporary state 402.

If the arrival time of the multipath signal in the search result matches that of one of the multipath signals existing in the multipath list, the arrival time and the signal-to-noise ratio of the multipath list is updated. This update process continues until arrival time and SNR of all the multipath signals from the same base station are updated. Once this update process finished, the rest of the steps in categorization proceeds as follows.

In step 428 of the present embodiment, signals that are categorized in temporary state 402 are checked in subsequent searcher operations to determine whether the signal maintains the SNR above T_ACCEPT, which itself satisfies the SNR threshold, over a time threshold, e.g. over N_ACCEPT consecutive SNR measurements. If the signal satiates the N_ACCEPT threshold per step 428, then the signal is categorized in potential state 404. Alternatively, if the signal does not satiate the N_ACCEPT threshold, then it remains categorized in temporary state 402. Step 432 is illustrated, in one embodiment, by the signal performance in FIG. 3. Both span 3 343 of signal 106d span 1 341 satiate the T_ACCEPT 326 threshold, but only span 1 342 satiates the N_ACCEPT 322 threshold. Consequently, at a time corresponding to span 3 343, signal 106d would be categorized in temporary state 402, while at time corresponding to span 1 341, signal 106d would be categorized in potential state 404.

In step 430 of the present embodiment, an inquiry determines whether a demodulating finger is not enabled and is available for demodulation. Step 430 is implemented in one embodiment by having one of demodulating fingers in rake receiver 226 of FIG. 2 available for demodulating a multipath signal. If a demodulating finger is available, then the signal initially categorized in potential state 404 is now categorized in assigned state 406 and thus the multipath signal is used for demodulation or a demodulating finger is assigned to the multipath signal. However, if a demodulating finger is not available, then the process proceeds to step 432.

In step 432 of the present embodiment, an inquiry determines whether the signal satiates both T_COMP and N_COMP thresholds. The T_COMP threshold represents a "comparison" margin threshold by which one signal categorized in a potential state 404 has to exceed the SNR of another signal in assigned state 406 in order to be promoted to assigned state. The comparison margin threshold also includes a time threshold, N_COMP consecutive SNR measurements, over which the T_COMP threshold is satiated. If a signal categorized in a potential state 404 has ongoing SNR performance that is greater than the SNR of one particular multipath in an assigned state 406 by more than T_COMP over N_COMP consecutive measurements, then the signal categorized in a potential state 404 is promoted to an assigned state 406, and the signal categorized in an assigned state 406 is demoted to a potential state. If the two signals switch between assigned and potential states, then a demodulating finger is reassigned from one multipath signal to another. Alternatively, if a signal SNR difference does not satiate T_COMP and N_COMP requirement, then the two signals remain categorized in original states. The purpose of these two thresholds is to only allow a signal categorized in an assigned state 406 to be replaced by a signal with substantially better performance in a consistent manner over time. This process avoids constant switching of states, e.g. thrashing, for signals when their performances are very close to each other. The present invention is well-suited to using a wide range of values for T_COMP and N_COMP, as appropriate for a given application. For example, T_COMP and N_COMP can be statically based upon T_ACCEPT and T_ACCEPT, or they can be dynamically based on actual values of SNR for signals categorized in assigned state 406.

The process of demoting from a state for the present embodiment, shown in demotion column 440, starts with a evaluating a performance of a signal that has been categorized in states 402–406. Step 442 inquires whether the signal has a SNR that is less than T_REJECT, e.g. multipath REJECT thresholds that are shown in FIG. 2, over a time threshold, e.g. over N_REJECT consecutive SNR measurements. If a signal categorized in assigned state 406 has ongoing SNR performance that is less than T_REJECT satiating the N_ACCEPT threshold, then the signal is demoted from assigned state 406, and rejected in step 450. Alternatively, if a signal categorized in assigned state 402 has ongoing SNR performance that is not less than T_REJECT over N_REJECT consecutive measurements, then the signal remains categorized in assigned state 406. If a signal is demoted from assigned state 406, then a demodulating finger may open up or be deassigned, allowing step 430 to determine whether a signal categorized in potential state 404 can be categorized in the higher assigned state 406.

Step 444 provides a process similar to that of step 442. In step 444, an inquiry determines whether the signal has a SNR that is less than T_REJECT, e.g. multipath REJECT thresholds over N_REJECT consecutive SNR measurements. If a signal categorized in potential state 404 has ongoing SNR performance that is less than T_REJECT thresholds over N_REJECT consecutive SNR measurements, then the signal is demoted from the potential state 404, and rejected in step 450. Alternatively, if a signal categorized in potential state 404 has ongoing SNR performance that is not less than T_REJECT over N_REJECT consecutive measurements, then the signal remains categorized in potential state 404.

Step 446 provides a process similar to that of step 442 but without time threshold criterion. In step 446, an inquiry determines whether the signal has a SNR that is less than T_ACCEPT. If a signal categorized in temporary state 402 has ongoing SNR performance that is less than T_, then the signal is demoted from the temporary state 402, and rejected in step 450. Alternatively, if a signal categorized in temporary state 402 has ongoing SNR performance that is not less than T_ACCEPT, then the signal remains categorized in temporary state 402.

The time thresholds utilized in process 400 can be implemented, in one embodiment, by using various timers or counters that are activated at the point during which an appropriate threshold is satisfied. The present embodiment maintains a separate timer for each multipath signal associated with potential state and assigned state, as required by step 442 and 444. Thus, for example, a multipath REJECT timer implemented in hardware portion 220 of communication device 200, can be used to estimate the fading duration of the long-term fading channel. The timer is initiated when a multipath reject threshold value is satisfied, e.g. when a multipath signal's performance drops below a threshold T_REJECT, and is reset and disabled if the multipath signal exceeds the threshold T_REJECT. Various defaults and expiration values can be established for the times to accommodate zero threshold settings.

The process of categorizing signals into states, e.g. promoting them and demoting them, per FIG. 4 is performed by the present embodiment by firmware 210, such as that shown in FIG. 2. That is, states can be recorded in RAM portion 218*a* of memory 216 of communication device 200. By using firmware, the present invention of managing demodulating fingers can be quickly and easily modified to suit a particular application, such as continuing development discoveries. The categorizing of signals into states can be accomplished by a wide variety of methods, such as using flags, or allocating memory registers to states, etc.

Figure 5:
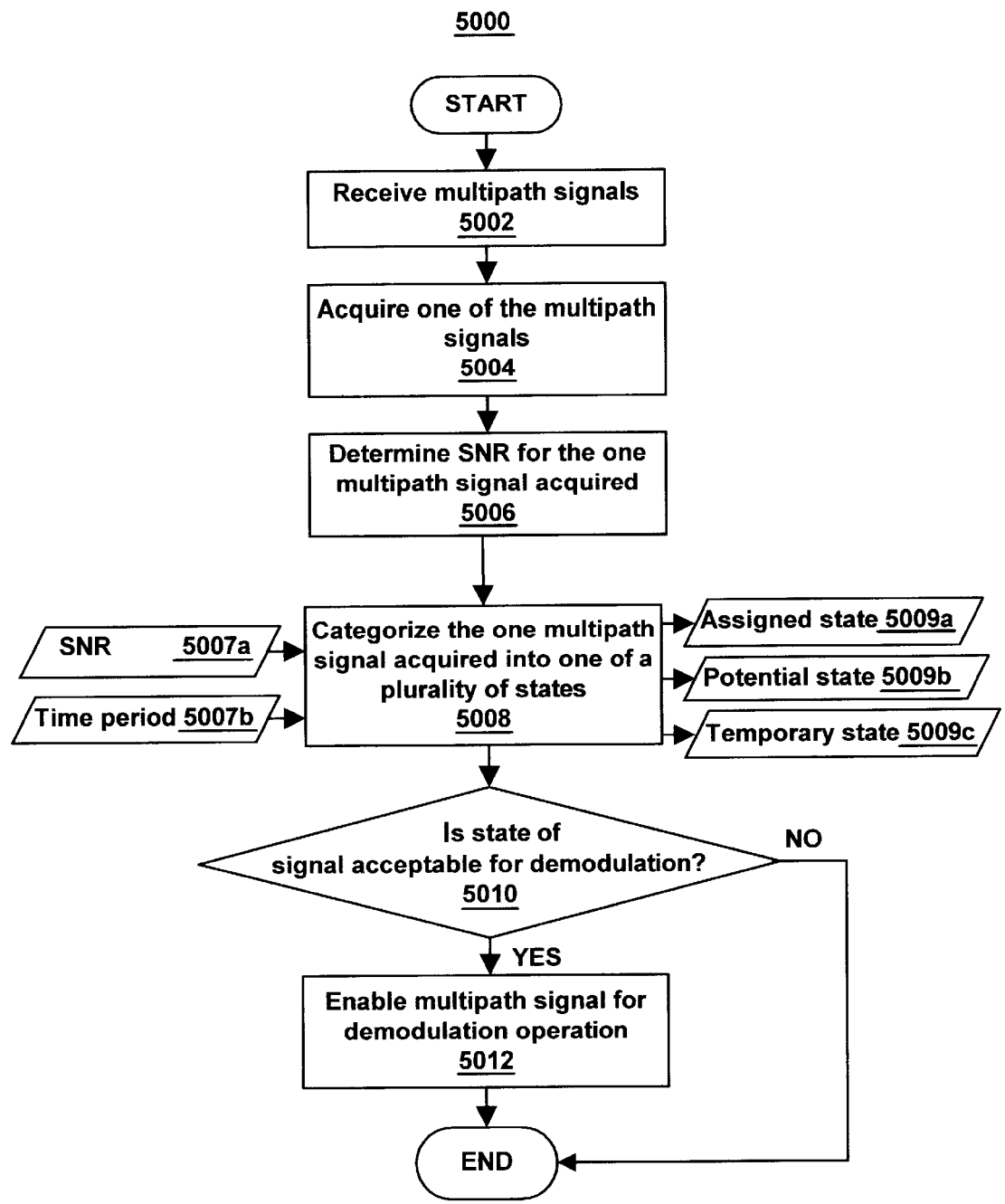
FIG. 5 is a flowchart of a process used to manage multipath signals in a communication device, in accordance with one embodiment of the present invention.

Referring now to FIG. 5, a flowchart of the process used to manage multipath signals in a communication device is shown, in accordance with one embodiment of the present invention. By using process 5000 embodiment, the present invention provides a method selects the most worthwhile candidates from all the different multipaths received in mobile phone for a subsequent demodulation and combining operation, without the detrimental effects of thrashing. While the present embodiment applies process 5000 to a CDMA digital communication system, the present invention can be applied to any communication system needing time tracking. Also, the present invention is applicable to both mobile units and base stations used for telecommunications operations.

Process 5000 begins with step 5002. In step 5002 of the present embodiment, multipath signals are received at a communication device. Step 5002 is implemented, in one embodiment, by the hardware 220 shown in FIG. 2. In one embodiment, multipath signals, such as those shown in prior art FIG. 1A, are received by antennae 202 and transceiver 204 of FIG. 2. Following step 5002, process 5000 proceeds to step 5004.

In step 5004 of the present embodiment, one of the multipath signals is acquired in terms of arrival time and signal strength. This is accomplished, in one embodiment, by a searcher portion 224 of communication device 200 of FIG. 2, as is well-known in the art. Following step 5004, process 5000 proceeds to step 5006.

In step 5006 of the present embodiment, a SNR ratio is determined for the multipath signal acquired. Step 5006 is implemented, in one embodiment, by a searcher portion 224 in conjunction with a firmware portion 210 of communication device 200 of FIG. 2, as is well-known in the art. While the present embodiment utilizes SNR to determine the quality of the acquired multipath signal, the present invention is well suited to alternative benchmarks. Following step 5006, process 5000 proceeds to step 5008.

In step 5008 of the present embodiment, the multipath signal acquired is evaluated for categorization into one of a plurality of states. Step 5006 is implemented, in one embodiment, by a firmware portion 210 of communication device 200 of FIG. 2. In one embodiment, process 400 is used to evaluate the categorization of signals into one of a plurality of states. However, the present invention is well-suited to using a wide variety of methods and criteria for evaluating a signal for categorization into a state. Following step 5008, process 5000 proceeds to step 5010.

In step 5010 of the present embodiment, an inquiry determines whether the state of the signal is acceptable for demodulation. If the state of the acquired multipath signal is acceptable for demodulation, then the process 5000 proceeds to step 4012. Alternatively, if the state of the acquired multipath signal is not acceptable for demodulation, then process 5000 proceeds to end.

In step 5012 of the present embodiment, the multipath signal is provided for a demodulation operation. Step 5012 is implemented, in one embodiment, by firmware 210 and hardware 220 portions of communication device 200 of FIG. 2. Specifically, the timing requirements for the acquired multipath signal are provided from firmware 2120 to one of the demodulating fingers, e.g. 221–223, in rake receiver 226 of communication device 200 to enable demodulation of the given multipath signal. Following step 5012, process 5000 proceeds to step 5014.

Process 5000 can be repeated to accommodate a number of significant timing factors. In one embodiment, the pilots in the active set of assigned-state and potential state signals available for demodulation can be sampled in one visit. In another embodiment, they may be visited several times in a search period, each time measuring all or some of the pilots in the active set. In order to guarantee a minimum search rate of the active set, the mobile station has a periodic search timer for the active set such that the strength and pseudonoise (PN) phase of all pilots in the active set at least one per period.

Many of the instructions for steps and the data stored in memory 222 for process 300, are executed using processor 220. The memory storage for the present embodiment can either be permanent, such as read only memory (ROM), or temporary memory such as random access memory (RAM). Memory 216 can also be any other type of memory storage, capable of containing program instructions, such as a hard drive, a CD ROM, or flash memory. Furthermore, processor 214 can either be an existing system processor, or it can be a dedicated digital signal processing (DSP) processor. Alternatively, the instructions may be implemented using a microcontroller or some other state machine.

Because the finger management process shown by process 5000 uses data stored as software, the present invention provides dynamic management. For example, thresholds used in process 5000 can be stored in memory. Thus, their values can be changed, in one embodiment. Threshold values can be programmed into ROM 218b or RAM 218a portions of memory 216. Threshold values can be provided or changed via instructions and data at the time the device is manufactured or it can be communicated to the device while the device is in service with a user.

While process 5000 of the present embodiment shows a specific sequence and quantity of steps, the present invention is suitable to alternative embodiments. For example, not all the steps provided for process 5000 are required for the present invention. And additional steps may be added to those presented. Likewise, the sequence of the steps can be modified depending upon the application. Furthermore, while process 5000 is shown as a single serial process, it can also be implemented as a continuous or parallel process. For example, instead of proceeding to end step, process 5000 could return to the start step for a second multipath signal after finishing step 4012 for a first multipath signal.

Many of the instructions for the steps, and the data input and output from the steps of process 5000 is implemented utilizing memory 216 and utilizing processor 214, as shown in FIG. 2. Memory storage 216 of the present embodiment can either be permanent, such as read only memory (ROM) 218b, or temporary memory such as random access memory (RAM) 218a. Memory 216 can also be any other type of memory storage, capable of containing program instructions, such as a hard drive, a CD ROM, or flash memory. Furthermore, processor 214 can either be a dedicated controller, an existing system processor, or it can be a dedicated digital signal processing (DSP) processor. Alternatively, the instructions can be implemented using some form of a state machine. The present embodiment is comprised of two major parts. Specifically, the present embodiment first determines the most worthwhile candidates from all the different multipaths (i.e. fingers) received in a searcher portion of a wireless communication system (in a manner as has been described above in detail in conjunction with FIGS. 2–5). Second, (as will be discussed below in detail in conjunction with FIGS. 6–10) the present embodiment then employs a novel method and apparatus to lock the previously finger and keep the finger appropriately assigned. In so doing, the present embodiment both manages (i.e. selects the most appropriate of available fingers) and locks (i.e. maintains the previously selected fingers in the most appropriate assigned state) fingers in a wireless communication system.

Figure 6:
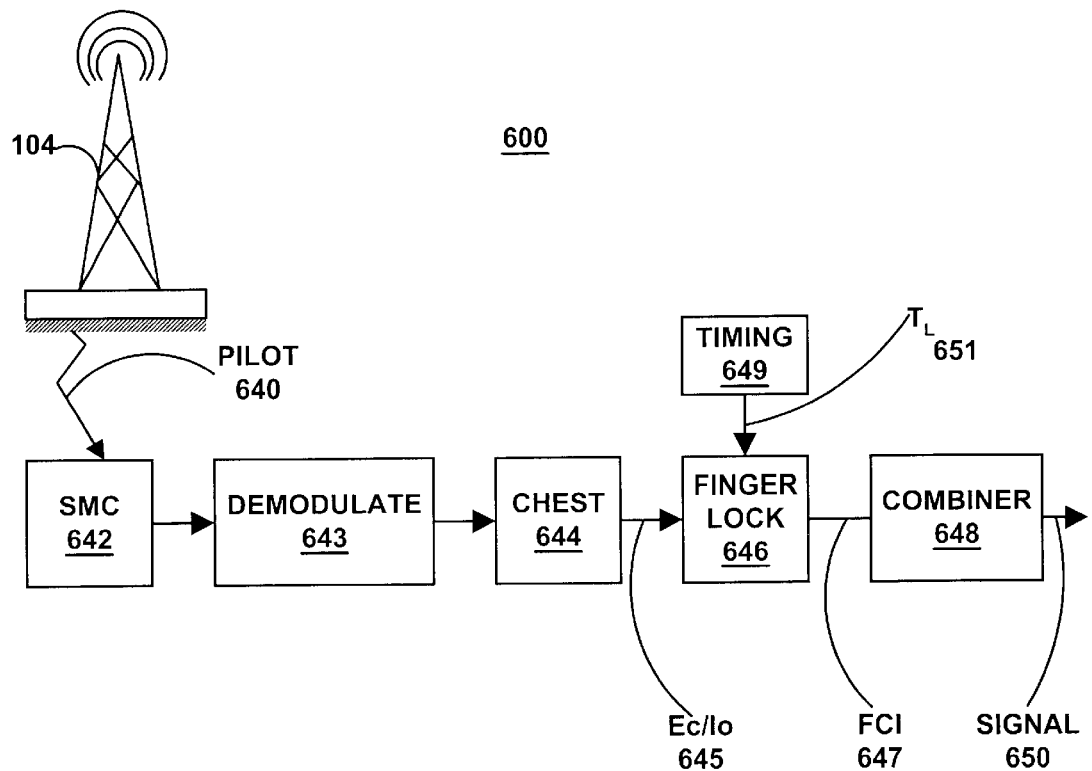
FIG. 6 is a block diagram of the management functions performed on a finger assignment in a communication device, in accordance with one embodiment of the present invention.

Referring now to FIG. 6, a block diagram of the management functions performed on a finger assignment in a communication device is shown, in accordance with one embodiment of the present invention. Block diagram 600 receives signal 640, transmitted from another device, e.g., base station 104. SMC Block 642 (Set Maintenance Central processing unit software) provides functions that such as channel estimation and searcher functions to retrieve and assign multipath signals from the PN space in the appropriate band for the communication device. SMC block 642 functions are well-known in the art. In the present embodiment, SMC block 642 functions according to the process described above in detail in, for example, process 5000 of FIG. 5.

Demodulating block 643 is coupled to SMC block 642. Demodulating block 643 performs the function of demodulating multipath signals using multiple demodulating fingers. The quantity of fingers used can vary widely, with the specific quantity of fingers upon a specific application goal and its available resources.

Channel estimating (CHEST) block 644 is coupled to demodulating block 643. CHEST block 644 provides a signal strength indication of a finger assignment. In one embodiment, CHEST block 644 is a new function that is separate from the channel estimator function performed by SMC block 642. In the present embodiment, CHEST block 644 performs dedicated channel estimation, and a more refined and accurate filtering operation, for a given multipath signal of the assigned finger. CHEST block 644 determines the $E_c/I_o$ ratio (e.g. received pilot energy per chip, $E_c$, divided by total received spectral density, $I_o$) and provides it, or a finger quality indicator (FQI), as output data 645 to the next block. In another embodiment, CHEST block 644 can use channel estimation data that was performed in the SMC block 642, and simply perform an additional filtering operation on that data. Channel estimators include function that are well-known in the art for performing signal-strength calculations. For example, the CHEST block performs functions such as quadrature despreading, a sum and dump function, and an infinite impulse response (IIR) filter function. The IIR filter can have appropriate coefficients, e.g., forgetting factors, specifically determined for a specific application, given its performance goals and available resources.

Finger lock block 646 is coupled to demodulating block 643, which receives the FQI data 645. Finger lock block 646 performs a logic function that interprets the $E_c/I_o$ data 645 received from CHEST block 644 and/or timer data 651 received from timer block 649. Finger lock block evaluates signal strength data 645 and timer data 651 against appropriate signal-strength thresholds and/or time thresholds to decide whether the multipath signal should be deassigned, locked, or subsequently combined. Details on the quantity, type, and values of thresholds is described in more detail in subsequent figures. Finger lock block 646 provides a finger combine indicator (FCI) output data 647 to the next block to which it is coupled, e.g., the combiner block 648.

Combiner block 648 combines, if directed by the FCI data 647 from finger lock block 646, multipath signals that were demodulated by the assigned fingers. If FCI data indicates that a multipath signal demodulated by a finger assignment should not be combined, then combiner block 648 does not combine it. Alternatively, if FCI data from finger lock block 646 indicates that a multipath signal demodulated by a finger assignment should be combined, then combiner lock 648 does combine it. Combiner block 648 provides composite signal output 650 that is decoded by subsequent function blocks that are not shown, but are well known in the art.

By using a CHEST block 644 to provide more accurate data on signal strength, and by using logic and multiple thresholds implemented by finger lock block 646 and timing block 649, the present invention provides an accurate and efficient buffer for holding assigned fingers during short-term fading. In contrast, the prior art would drop finger assignments during short term fading, and reassign them when they recovered, thus causing the undesirable effect of thrashing.

Figure 7:
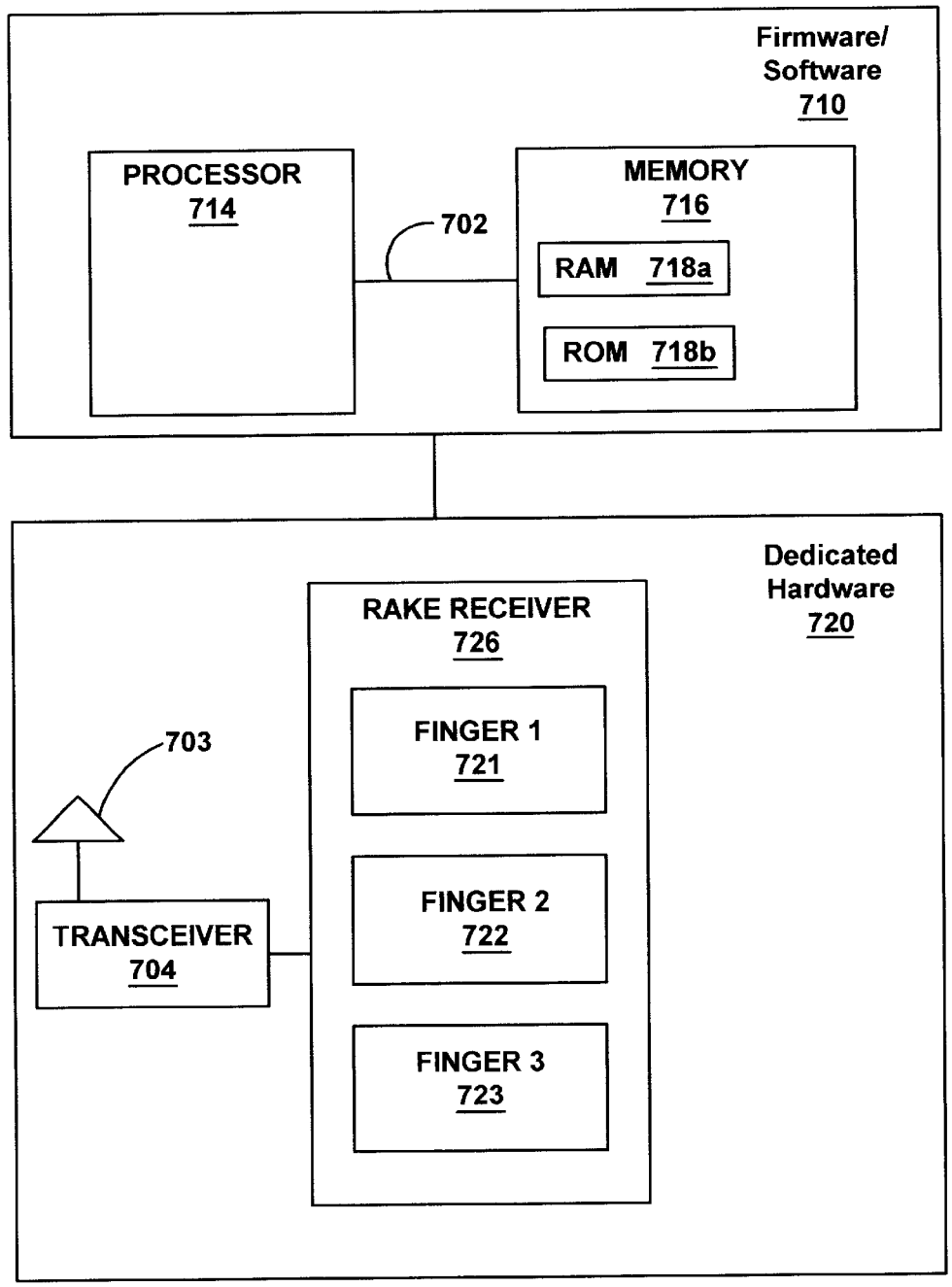
FIG. 7 is a block diagram of a communication device used for finger lock management of assigned fingers, in accordance with one embodiment of the present invention.

Referring now to FIG. 7, a block diagram of a communication device used for finger lock management of assigned fingers is shown, in accordance with one embodiment of the present invention. Communication device 700, e.g., a mobile or base unit, includes two general sections: firmware/software 710 and dedicated hardware 720. Firmware/software section 710 includes processor 714 and memory 716, coupled to each other via bus 702. Firmware/software section 710 can be a general purpose device, or a specialized digital signal processing (DSP) device. Alternatively, the functions performed by firmware/software section 710 can be implemented using a specialized state machine.

Hardware section 720 of FIG. 7 includes an antennae 703, a transceiver 704, and a rake receiver 726. Hardware section 720 is coupled to firmware/software portion 710 of communication device 710 to provide the raw data with which the firmware/software section can digitally process. Antennae 703 is coupled to transceiver 704, which is in turn coupled to rake receiver 726.

Bus 702 provides an exemplary coupling configuration of devices in communication system 700. Bus 702 is shown as a single bus line for clarity. It is appreciated by those skilled in the art that bus 702 can include subcomponents of specific data lines and/or control lines for the communication of commands and data between appropriate devices. It is further appreciated by those skilled in the art that bus 702 can include numerous gateways, interconnects, and translators, as appropriate for a given application.

The present embodiment of FIG. 7 shows that rake receiver 726 includes three fingers, e.g. finger 1 721, finger 2 722, and finger 3 723. However, the present invention is well-suited to using any quantity of fingers in rake receiver 726. Each finger 721–723 is coupled to transceiver 704 so that it may independently identify and demodulate its respective multipath signal. By using a combination of hardware 720 and firmware 710, the present invention provides efficient and flexible management of finger assignments for multipath signals, as described more fully hereinafter.

Transceiver 704, processor 714, and memory 716 of FIG. 7 perform functions of SMC block 642 of FIG. 6, in one embodiment. Similarly, functions performed by demodulation block 643, channel estimator block 644, finger lock block 646, timer block 649, and combiner block 648 of FIG. 6 can be implemented by rake receiver 726, processor 714, and/or memory 716 of FIG. 7, in one embodiment.

It is also appreciated that communication system 700 is exemplary only and that the present invention can operate within a number of different communication systems. Furthermore, the present invention is well-suited to using a host of intelligent devices that have similar components as exemplary communication system 700.

Figure 8:
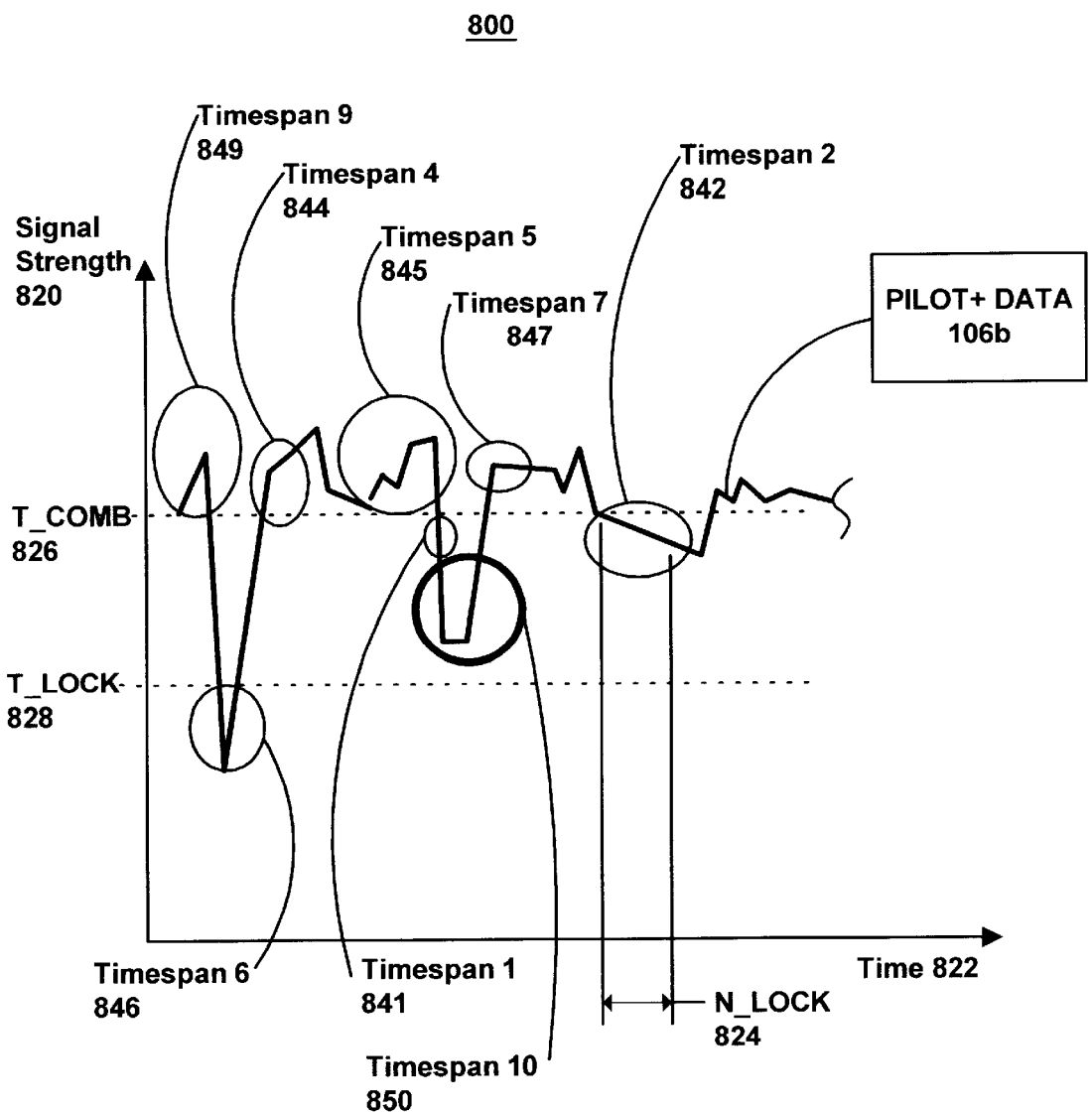
FIG. 8 is a graph of the performance of one assigned finger over time as compared with multiple performance thresholds, in accordance with one embodiment of the present invention.

Referring now to FIG. 8, a graph of the performance of one assigned finger over time as compared with multiple performance thresholds is shown, in accordance with one embodiment of the present invention. Subsequent figures will utilize this performance curve as an example to illustrate the functions and the present invention's processes, e.g. managing assigned fingers.

Graph 800 has an abscissa of time 822 and an ordinate of signal-strength 820. Signal-strength can represent absolute signal power or some version of signal to noise ratio (SNR) such as $E_c/I_c$, described hereinabove. Second multipath signal 106b is shown as an exemplary signal charted over a period of time. Graph 800 illustrates multiple thresholds used in the present invention. A first signal-strength threshold, Threshold Combine (T_COMB) 826, represents the threshold by which the management process of the present invention approves a finger assignment for a subsequent combine operation.

In conjunction with the T_COMB 826 threshold, the present embodiment also includes a second signal-strength threshold of Threshold Lock (T_LOCK) 828. In the present embodiment, T_LOCK 828 has a lower value than T_COMB 826. T_LOCK threshold 828, represents the threshold by which the management process of the present invention decides whether to lock or deassign a finger assignment.

The third, and final, threshold is a time threshold, N_LOCK 824, which elates to the amount of time that a multipath signal exists between the T_COMB 826 and T_LOCK 828 thresholds. While the present embodiment provides all three thresholds for evaluating the status of a multipath signal of a finger assignment (e.g. for a subsequent combine or deassign operation), the present invention is also suitable to using less than all three thresholds. The specific values T_LOCK 828, T_COMB 826, N_LOCK 824 can span a wide range of values, which are chosen depending upon requirements and assumptions for the specific application, hardware, and/or protocol used for a communication system.

Still referring to FIG. 8, timespan 9 849, timespan 4 844, timespan 5 845, and timespan 7 847, show performances of second multipath signal 106b that exceed T_COMB threshold 826. In contrast, timespan 6 846 shows a performance of second multipath signal 106b that fail to satiate T_COMB threshold 828. Finally, timespan 1 841, and timespan 10 850 show performances of second multipath signal 106b that exceed T_COMB threshold 826. Multiple system cycles can occur over any of the time spans listed in FIG. 8. Subsequent figures will refer to these specific timespan to illustrate the states and the processes of the present invention management of finger assignments.

Figure 9A:
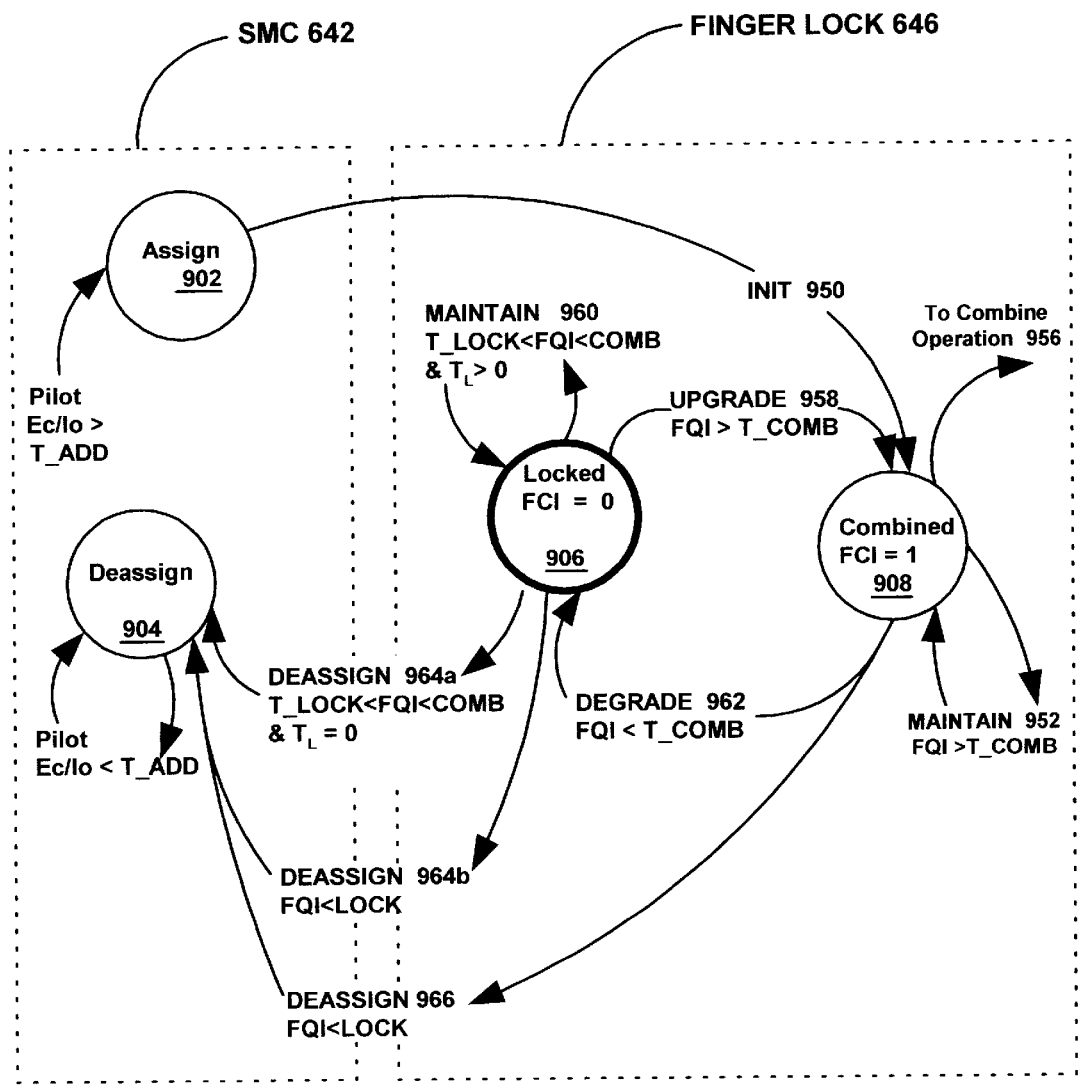
FIG. 9A is a state diagram of finger locking states into which a finger assignment can be categorized, in accordance with one embodiment of the present invention.

Referring now to FIG. 9A, a state diagram of finger locking states into which a finger assignment can be categorized is shown, in accordance with one embodiment of the present invention. State diagram 900a shows the virtual interaction between the states in which a finger assignment may be categorized and managed by the present invention. State diagram 900a will be used in subsequent figures to explain how the processes and equipment of the present invention effectively categorize and transition multipath signal finger assignments in these states. The thresholds referred to in FIG. 9A will be referenced to specific timespans of exemplary signal in FIG. 8 so as to provide explicit examples of state categorization and state transitions.

State diagram 900a of FIG. 9A shows states available for a multipath signal, as decided and provided by SMC (Set Maintenance Central processing unit (CPU)) software, e.g. by SMC block 642 of FIG. 6 described hereinabove. Multipath signals can have either of two states provided by SMC block 642 in FIG. 9A. The first state is an assigned state 902, having a prerequisite condition that the pilot portion of the multipath signal have a signal-strength, e.g. $E_c/I_o$, that is greater than (>) the threshold for adding (T_ADD). The T_ADD threshold used by a searcher is well-known in the art; its description is omitted herein for purposes of clarity. In the present embodiment, T_ADD has a lower value than either T_LOCK or T_COMB.

The second state provided by the SMC block 642 of FIG. 9A is a deassign state 904. One condition for maintaining a multipath signal, previously categorized in deassigned state 904, in the deassigned state 904, is when the pilot portion of the multipath signal has a signal-strength, e.g. $E_c/I_o$, that is less than (<) the threshold for adding (T_ADD). Multipath signals categorized in locked state 906 or combined state 908 can be degraded into deassigned state 904, as described hereinafter. These conditions will be described hereinafter.

Finger lock function block 646 also provides multiple states for a multipath signal as shown in state diagram 900a. The present embodiment shows that two states exist in finger lock function block 646. The first state is a combined state 908. One condition by which a multipath signal can be categorized in combined state 908 is via an initial condition 950. Initial condition 950 occurs when multipath signal is initially assigned, by SMC block 642, e.g. the multipath signal in question was not in a combined or locked state in the immediately preceding cycle of the management process. In the present embodiment, the FQI, e.g. $E_c/I_o$, does not necessarily need to satisfy T_LOCK or T_COMB thresholds, though it likely will. The initial condition occurs the first time a multipath signal designation (viz. specific PN offset) enters the assigned state. Timespan 9 849 of FIG. 8 illustrates this state change scenario, where it is assumed that multipath signal 106d has just been acquired by searcher in timespan 9 849. Timespan 4 844 of FIG. 8 also illustrates the state change scenario, where second multipath signal 106b has been deassigned by SMC block 642 at timespan 6 846, and thus appears as a new multipath signal assignment from SMC block 642.

Another condition whereby a multipath signal is categorized in combined state 908 is via an upgrade condition 958. Specifically, upgrade condition 958 occurs when a multipath signal previously categorized in the locked state 906 has a finger quality indicator (FQI) that exceeds (>) T_COMB threshold. Timespan 7 847 of FIG. 8 illustrates this state transition scenario where multipath signal 106b is in a locked state because its FQI>T_LOCK threshold, but its timespan at this FQI is less than the N_LOCK threshold. One condition that allows a multipath signal to remain categorized in combined state 908 is a maintain condition 952, whose criteria is that the FQI of the multipath signal is greater than T_COMB threshold. Timespan 5 845 of FIG. 8 illustrates this state scenario. A multipath signal categorized in combine state 908 is provided for a subsequent combine operation 956.

For a multipath signal categorized in combined state 908, the finger combine indicator (FCI) is set to one (1) to represent a state that the multipath signal can be combined in a subsequent combine operation. The FCI can represent an actual binary bit that can be a set or clear flag in a digital logic circuit or in software.

The second state in finger lock function 646 is a locked state 906. One condition by which a multipath signal may enter lock state 906 is to downgrade condition 962 previously described. A multipath signal previously categorized in combined state 908 can be downgraded to a locked state 906 by downgrade condition 962. Downgrade condition 962 occurs if multipath signal has FQI that is less than T_COMB but greater than T_LOCK Timespan 1 841 of FIG. 8 illustrates this state change scenario. Similarly, a multipath signal previously categorized in combined state 908 can be downgraded to the SMC function block 642, where it can be categorized in deassigned state 904 by downgrade condition 966. Downgrade condition 966 occurs if multipath signal has FQI that is less than T_LOCK for any period of time. Timespan 6 846 of FIG. 8 illustrates this state change scenario.

One condition in which a multipath signal presently categorized in locked state 906 can remain in locked state 906 is a maintain condition 960. Maintain condition 960 occurs for a multipath signal, previously categorized in locked state 906, whose FQI is less than T_COMB but greater than T_LOCK threshold, and whose timer has not exceeded time threshold, $T_L$ (e.g., $T_L$ is greater than zero for a countdown timer configuration). Timespan 10 850 of FIG. 8 illustrates this locked state scenario because its timespan is not greater than N_LOCK 824, by visual observation. The recover y of signal 106b from timespan 10 illustrates a short-fade condition that did not create thrashing in a communication system because of the present invention's finger assignment management system.

A multipath signal previously categorized in locked condition 906 is downgraded from locked condition 906 if it fails to satiate conditions for the lock state 906. Specifically, first downgrade condition 964a occurs if multipath signal has a FQI that is less than T_COMB threshold and greater than T_LOCK threshold, but whose timer has exceeded the time threshold, $T_L$ (e.g., timespan 2 842 of FIG. 8 illustrates this state change scenario because its timespan exceeds N_LOCK 824 threshold by visual observation). Second downgrade condition 964b occurs if multipath signal has a FQI that is less than T_LOCK threshold. Timespan 6 846 of FIG. 8 illustrates this state scenario, assuming it was categorized in lock state 906 at least once between timespan 9 849 and timespan 6 846. When multipath signals are downgraded from locked state 406, control of the finger is passed to SMC function 642. SMC can perform any function or state categorizing of multipath signal, such as categorizing it in deassigned state 904, where it will remain so long as the pilot $E_c/I_o$ is less than T_ADD.

Multipath signals categorized in locked state 906 are monitored by a timer, activated upon initial categorization into this state. Additionally, multipath signals categorized in locked state 906 have FCI set to zero (0) so that the multipath signal in question is not available for the subsequent combine operation. In one embodiment, each multipath signal finger assignment is independent of other multipath signal finger assignments. As such, more than one multipath signal can occupy any one of the states presented in FIG. 9A. While the present embodiment of FIG. 9A provides specific requirements for categorizing a multipath signal into a state, and for a transition between states, the present invention is well-suited to using alternative thresholds or conditions.

Figure 9B:
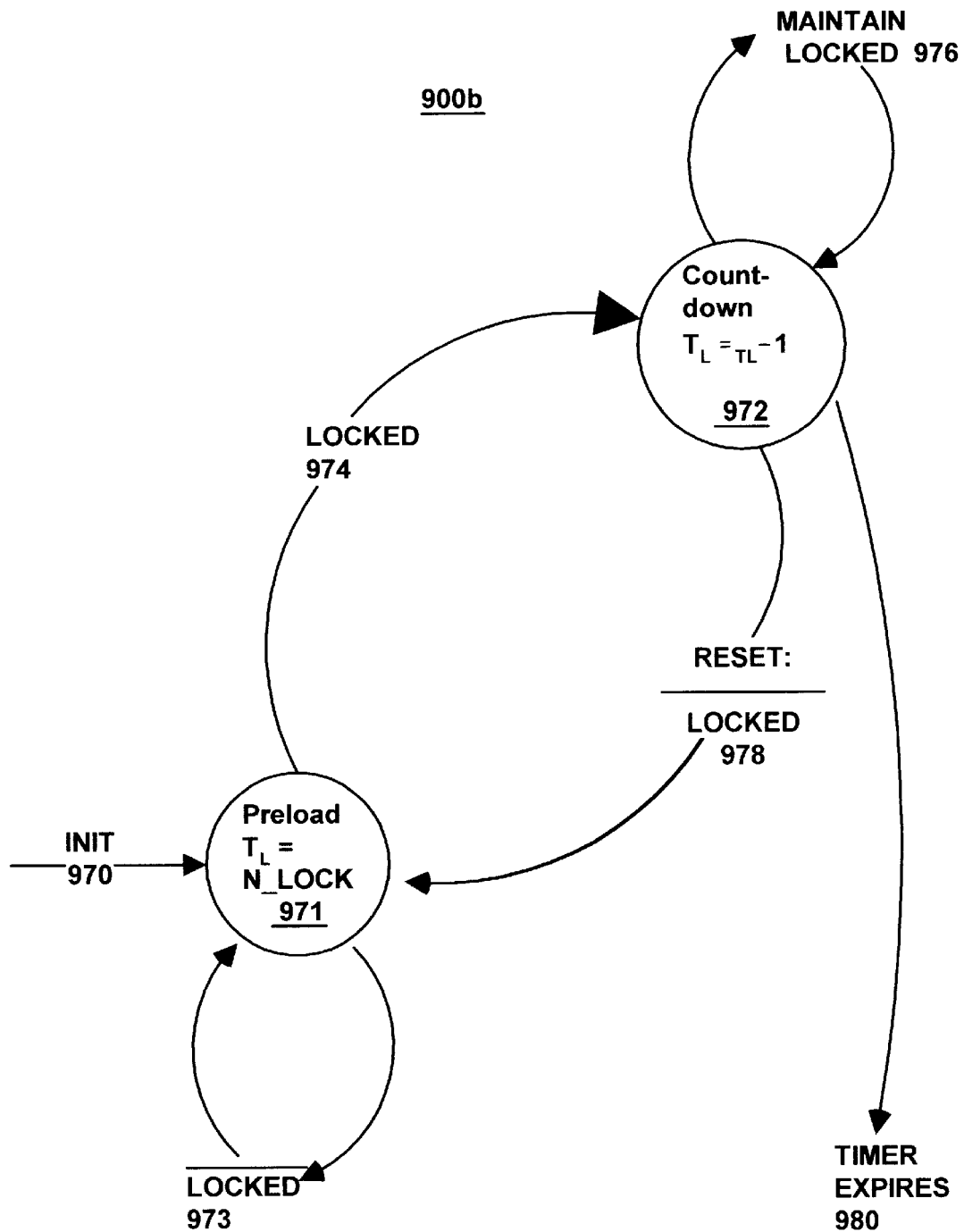
FIG. 9B is a state diagram of timing states into which a finger assignment can be categorized, in accordance with one embodiment of the present invention.

Referring now to FIG. 9B, a state diagram of timing states into which a finger assignment can be categorized is shown, in accordance with one embodiment of the present invention. State diagram 900b of FIG. 9B works in coordination with state diagram 900a of FIG. 9A, to provide the timer state portion of the conditions required for the state categorization and to provide the combine state changes of a multipath signal to satisfy the finger management process of the present invention, as described more fully in subsequent figures.

Timing diagram 900b includes two states, a preload state 970 and a count-down state 972. The present embodiment utilizes a count-down timer. However, the timer function can be accommodated by a count-up timer that is compared against a threshold, with appropriate indicating logic. The timer function can be implemented by hardware, such as timer block 728 of FIG. 7.

Preload state 970 sets the time threshold, $T_L$, to N_LOCK 824, shown in FIG. 8. If the multipath signal does not enter a locked state, then it remains unlocked, per maintain condition 973. However, if multipath signal changes to a locked state, then the timer changes states per condition 974. The timer state can return from the countdown state 972 to preload state 970 if multipath signal becomes unlocked, per condition 978.

Countdown timer state 972 decrements the countdown timer for a given multipath signal. Multipath signal remains in countdown state if its signal-strength causes it to remain in a locked state, shown as condition 976. The decrement in countdown timer can be a sampling occurrence where signal quality is determined, e.g. once per system operational cycle. This decrement can be correlated to a desired specific time value. For example, timer threshold can be set for 10 cycles in a 5 MHz system, or 20 cycles in a 10 MHz system, to obtain the same duration of short-fade. The timer states can also change if the timer expires, shown as condition 980 in FIG. 9B. The timer expiration also causes a change in the finger locking states of the multipath signal, per FIG. 9A.

While state diagrams 900a and 900b of FIG. 9A and 9B, in the present embodiment, define thresholds in terms of inequalities, e.g. operands such as ">" or "<," the present invention is also well-suited to using other operands such as "≧" or "≦" to define the pass/fail criteria for a threshold.

Figure 9C:
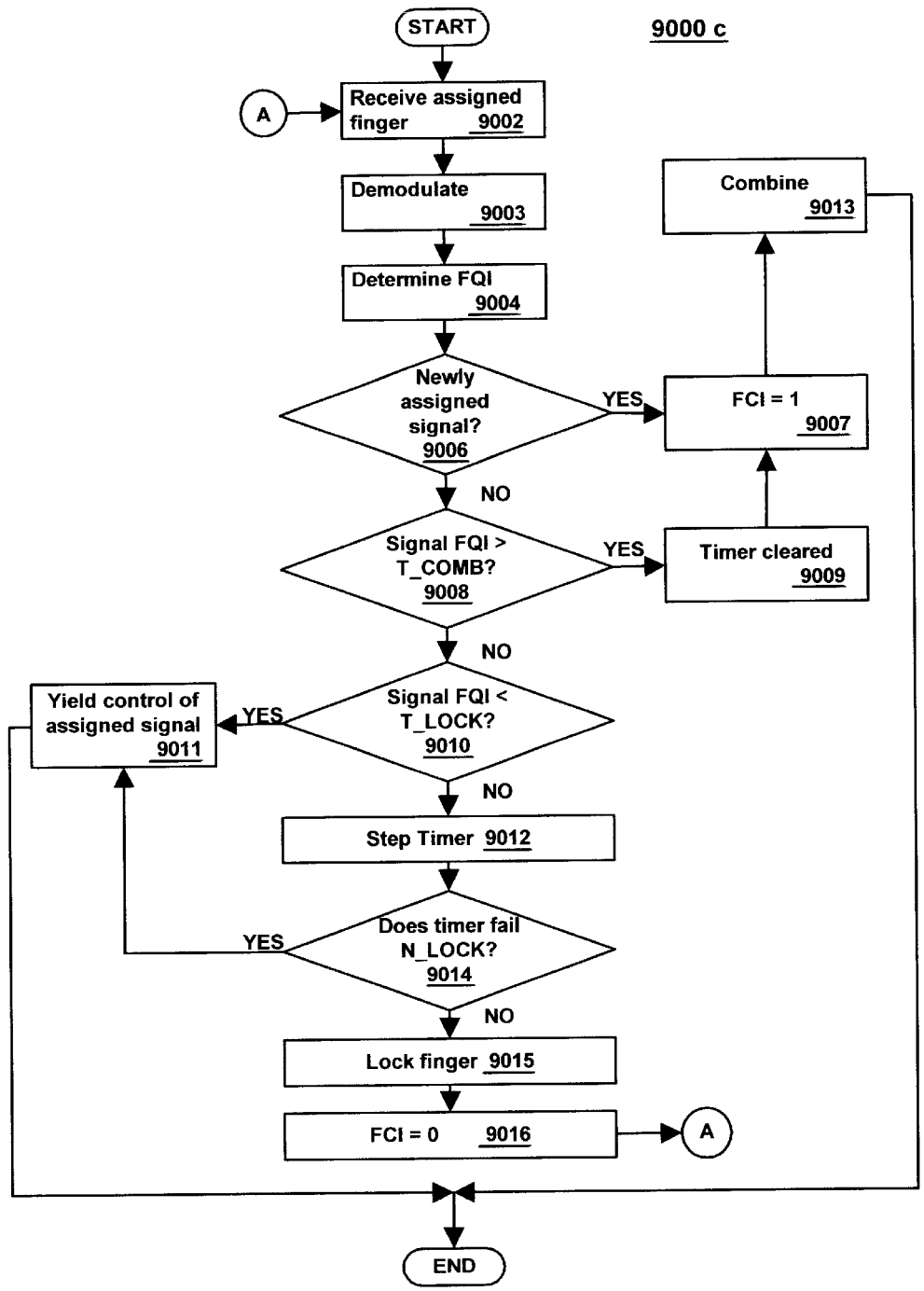
FIG. 9C is a flowchart of a process for implementing the state diagrams for finger locking states and for timing states in a communication device, in accordance with one embodiment of the present invention

Referring now to FIG. 9C, a flowchart of a process for implementing the state diagrams for finger locking states and for timing states in a communication device is shown, in accordance with one embodiment of the present invention. Flowchart 9000c essentially provides one embodiment of the sequence of queries that can satisfy the state categorizations and state transitions of FIGS. 9A and 9B. However, the present invention is well-suited to using alternative sequences, queries, and processes to accomplish the aforementioned state conditions. The steps of flowchart 9000c can be implemented by the various components of communication device 700 of FIG. 7. In particular, the queries and the logic of process 9000c can be implemented using a state machine or by using firmware/software 710 in combination with the hardware 720 components of communication device 700.

Process 9000c begins with step 9002. In step 9002 of the present embodiment, a finger assignment is received at communication device. Step 9002 is implemented, in one embodiment, by one of the fingers shown in rake receiver 726 shown in FIG. 7. The multipath signal has already been determined and assigned for a finger by SMC block 642, implemented in firmware/software 710 of communication device 700. Following step 9002, process 9000c proceeds to step 9003.

In step 9003 of the present embodiment, the multipath signal assigned is demodulated by a finger. Step 9003 is accomplished, in one embodiment, by rake receiver portion 726 of communication device 700, shown in FIG. 7. Specifically, one of the multiple fingers is assigned to a signal finger, e.g. finger 1 721, in rake receiver 726. The demodulation step is well-known by those skilled in the art. Following step 9003, process 9000c proceeds to step 9006.

In step 9004 of the present embodiment, the finger quality indicator (FQI) is determined. Step 9004 is accomplished, in one embodiment, by software/firmware 710 portion of communication device 700. Step 9004 provides continuous signal-strength indicators, e.g. $E_c/I_c$ calculations, for a given multipath signal. Following step 9004, process 9000c proceeds to step 9006.

In step 9006 of the present embodiment, an inquiry determines whether the multipath signal is a newly assigned signal, e.g. the multipath signal was previously unassigned by a searcher. If the multipath signal is a newly assigned signal, then the process 9000c proceeds to step 9007. Alternatively, if the multipath signal is not a newly assigned signal, then process 9000c proceeds to step 9008. Step 9006 provides the logic for demodulating a newly acquired signal immediately, and thus avoiding latency associated with subsequent steps in process 9000c. Step 9006 is one implementation of the logic used to implement initial state condition 950 of state diagram 900a shown in FIG. 9A.

Step 9007 arises if the multipath signal is a newly assigned signal, per step 9006. In step 9007 of the present embodiment, a finger combine indicator (FCI) is set to a value of one (1). By setting FCI=1, step 9007 provides a bit flag that will enable, in the present embodiment, the assigned multipath signal to be combined in subsequent operation. The present invention is well-suited to using alternative logic and alternative devices to accomplish the step of enabling the multipath signal to be combined when the required performance conditions are satiated, e.g. per conditions of state diagrams in FIGS. 9A and 9B. Following step 9007, process 9000c proceeds to step 9013.

In step 9013 of the present embodiment, a combine operation is performed. Step 9013 is performed only on those signals with a FCI=1, which indicates that the signal is of sufficient quality to improve the overall composite signal that results from the combine operation. The alternative state of FCI=0 is discussed in a subsequent step. Step 9013 implements the combine operation 956 of state diagram 900a shown in FIG. 9A. Following step 9013, process 9000c ends.

Step 9008 arises if the assigned multipath signal is not a newly assigned signal, per step 9006. In step 9008 of the present embodiment, an inquiry determines whether the FQI is greater than the T_COMB threshold. If the multipath signal has an FQI greater than the T_COMB threshold, then the process 9000c proceeds to step 9009. Alternatively, if the multipath signal has an FQI that is not greater than the T_COMB threshold, then the process 9000c proceeds to step 9010. Step 9008 provides the logic for evaluating a first signal-strength threshold, T_COMB, shown in FIG. 8 as T_COMB threshold 826. Step 9008 is one implementation of the logic used to distinguish between combine state 908 and locked state 906, per state change condition 958, state change condition 962, and state maintain condition 960, of state diagram 900a shown in FIG. 9A.

Step 9009 arises if the multipath signal has an FQI greater than the T_COMB threshold, per step 9008. In step 9009 of the present embodiment, the timer is cleared. This condition accounts for the scenario where the multipath signal has sufficient signal-strength, e.g. above T_COMB threshold, such that the timer threshold is not of concern. Consequently, the timer is cleared to remove any residual values or states that may have existed. This step can also be applicable for a newly assigned signal, per step 9006, though it is not part of the present embodiment. Following step 9009, process 9000c proceeds to step 9007, described hereinabove.

Step 9010 arises if the multipath signal has an FQI that is not greater than the T_COMB threshold, per step 9008. In step 9010 of the present embodiment, an inquiry determines whether the FQI of the multipath signal in question is less than the T_LOCK threshold. If the multipath signal has an FQI less than the T_LOCK threshold, then the process 9000c proceeds to step 9011. This condition accounts for the scenario where the multipath signal does not have sufficient signal-strength, e.g. below T_LOCK threshold, to even remain a potential candidate for combining. In particular, this scenario represents deep fading that is significant enough to render assigned multipath signal unworthy of a locked state. Alternatively, if the multipath signal has an FQI that is not less than the T_LOCK threshold, then the process 9000c proceeds to step 9012. This condition accounts for the scenario where the multipath signal does have sufficient signal-strength, e.g. above T_LOCK threshold, that it has a high probability of quickly returning to an even higher signal-strength, e.g. T_COMB, which is suitable for the subsequent combining operation.

Step 9010 provides the logic for evaluating a second signal-strength threshold, T_LOCK, shown in FIG. 8 as T_LOCK threshold 828. Step 9010 is one implementation of the logic used to distinguish between combine state 908 and locked state 906 and deassign state 904, per state change condition 964b and state maintain condition 960, of state diagram 900a shown in FIG. 9A.

Step 9011 can arise under several conditions, in the present embodiment. First, step 9011 can arise if the multipath signal has an FQI less than the T_LOCK threshold, per step 9010. Second, step 9011 can arise if a timer for multipath signal exceeds N_LOCK threshold, per step 9014. In step 9011, control of the finger assignment is yielded to the searcher, which will most likely deassign the multipath signal in question. However, the present invention is well-suited to alternative dispositions for multipath signal, other than the locked state. Because the multipath signal is removed from the locked state conditions, the timer is cleared to remove any residual values or states that may have existed. This step can also be applicable for a newly assigned signal, per step 9006, though it is not part of the present embodiment.

Step 9012 arises if the multipath signal has an FQI that is less than T_COMB threshold per step 9008 and an FQI that is greater than the T_LOCK threshold, per step 9010. In step 9012 of the present embodiment, the timer is stepped. This condition accounts for the scenario where the multipath signal has sufficient signal-strength, e.g. above T_LOCK threshold, that it has a high probably of quickly returning to an even higher signal-strength, e.g. T_COMB, suitable for the subsequent combining operation. However, to monitor the speed of the recovery of the signal-strength for the assigned multipath signal in question, the timer is stepped, or incremented. The timer can either be a count-up or a count-down timer, as previously discussed for FIGS. 6 and 7. Step 9012 can be implemented similarly to the implementation of step 9009. Following step 9012, process 9000c proceeds to step 9014.

In step 9014 of the present embodiment, an inquiry determines whether the timer designated for the assigned multipath signal in question fails to satisfy the N_LOCK threshold. In the present embodiment, the N_LOCK threshold 824 is shown in FIG. 8 as a given span of time. Thus, a multipath signal fails the threshold if the signal exceeds the amount of time provided by the N_LOCK threshold. If the multipath signal does exceed the N_LOCK threshold, then process 9000c proceeds to step 9011. Alternatively, if the multipath signal does not exceed the N_LOCK threshold, then process 9000c proceeds to step 9016. Step 9014 provides the logic for evaluating a time threshold for the signal-strength performance. That is, if the assigned multipath signal does not improve its signal-strength within the given period of time, e.g. N_LOCK, then it has a low probability of recovering from its fade condition. Step 9014 is one implementation of the logic used to distinguish between locked state 906 and deassigned state 904, per state change condition 964a, state maintain condition 960, of state diagram 900a shown in FIG. 9A. Step 9014 also provides one implementation of the logic used to accommodate the timing state diagram 900b of FIG. 9B.

Step 9015 arises if the multipath signal fails to satiate the timing threshold, N_COMB, per step 9014. Step 9015, in the present embodiment, locks the finger assignment. This step is indirectly accomplished by not allowing the finger assignment to be combined per step 9013 and by not yielding control of the assigned finger to the searcher, where it would most likely be deassigned. Thus, the present embodiment of a finger lock is temporarily implemented. Following step 9015, process 9000c proceeds to step 9016.

In step 9016 of the present embodiment, the finger combine indicator (FCI) is set to a value of zero (0). Step 9007 is accomplished, in a manner similar to that described in step 9007, discussed hereinabove, albeit opposite polarity. By setting FCI=0, step 9016 provides a bit flag that will disable, in the present embodiment, the assigned multipath signal from being combined in a subsequent operation. Following step 9016, process 9000c returns to step 9002.

Many of the instructions for the steps, and the data input and output from the steps of process 9000c can be implemented utilizing memory 716 and utilizing processor 714, as shown in FIG. 7. The memory storage for the present embodiment can either be permanent, such as read only memory (ROM), or temporary memory such as random access memory (RAM). Memory 716 can also be any other type of memory storage, capable of containing program instructions, such as a hard drive, a CD ROM, or flash memory. Furthermore, processor 714 can either be an existing system processor, or it can be a dedicated digital signal processing (DSP) processor. Alternatively, the instructions may be implemented using a microcontroller or a state machine.

While process 9000c of the present embodiment shows a specific sequence and quantity of steps, the present invention is suitable to alternative embodiments. For example, not all the steps provided for process 9000c are required for the present invention. And additional steps may be added to those presented. Likewise, the sequence of the steps can be modified depending upon the application. Furthermore, while process 9000c is shown as a single serial process, it can also be implemented as a continuous or parallel process.

Figure 10:
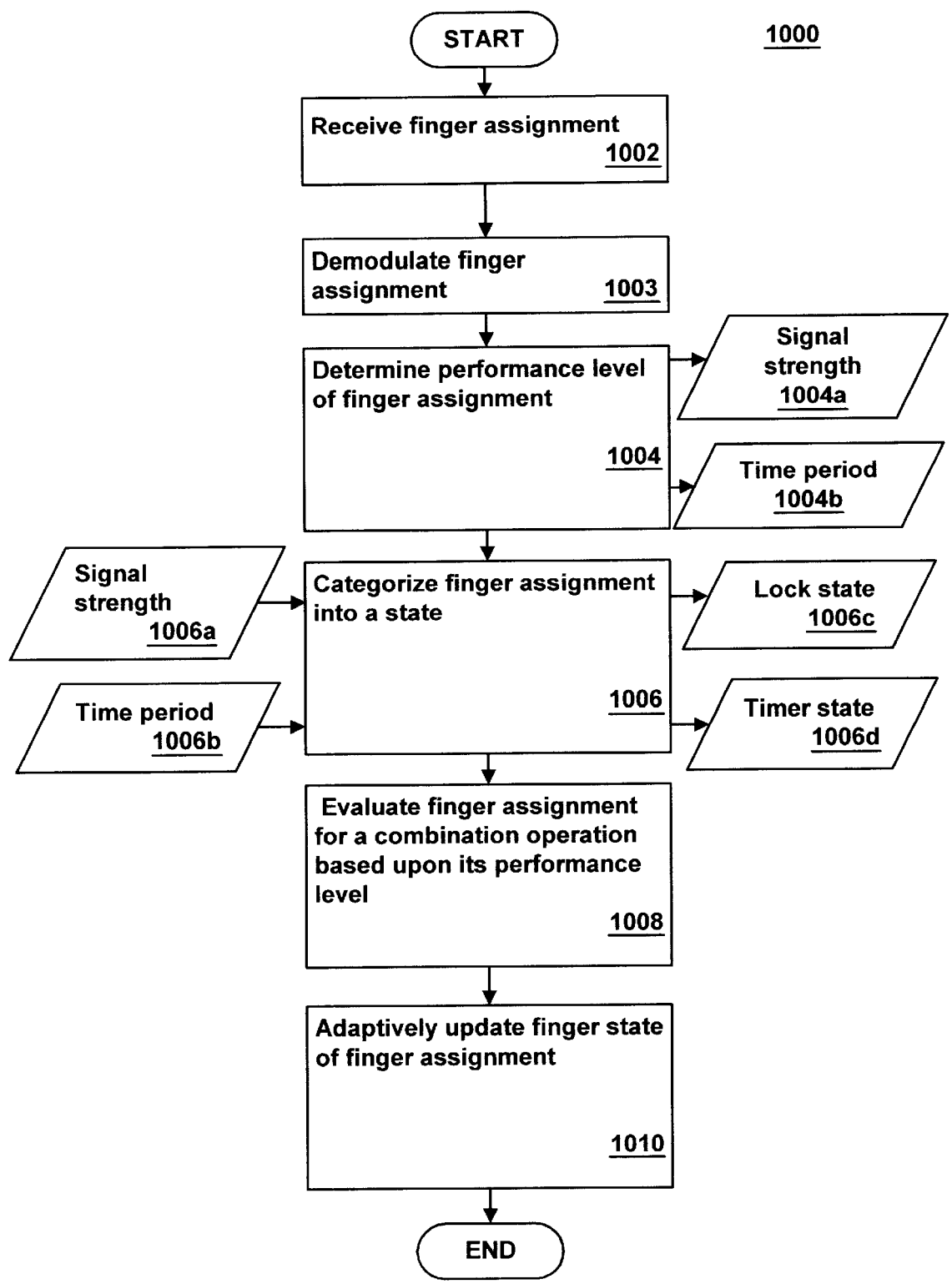
FIG. 10 is a flowchart of a process used for finger lock management of assigned fingers in a communication device, in accordance with one embodiment of the present invention.

Referring now to FIG. 10, a flowchart of the process used for finger lock management of assigned fingers in a communication device is shown, in accordance with one embodiment of the present invention. By using process 1000 embodiment, the present invention provides a method of implementing multiple thresholds, including an optional time threshold, to manage an assigned multipath signal for a demodulating finger. By adaptively managing the assigned multipath signal, the present invention avoids latency and thrashing problems associated with conventional communication systems. As a result of implementing the present invention, capacity, fidelity, and performance of a digital communication system is enhanced. The process of the present invention is applicable to any type of communication device, such as mobile units (e.g. cell phones) and base stations.

Process 1000 begins with step 1002. In step 1002 of the present embodiment, a finger assignment, e.g., an active multipath signal designation, is received at a communication device. Step 1002 is implemented, in one embodiment, using the function blocks described in FIG. 6, using the devices described in FIG. 7, and/or using the method described in FIG. 9C. Step 1002 is also well-suited to using the alternatives described for these function blocks, devices, and methods of prior figures. Following step 1002, process 1000 proceeds to step 1003.

In step 1003 of the present embodiment, the finger assignment is provided to a demodulating finger where it is demodulated. Step 1002 is implemented, in one embodiment, by step 9003 of FIG. 9C. Following step 1003, process 1000 proceeds to step 1004.

In step 1004 of the present embodiment, a performance level of a finger assignment is determined. Step 1002 is implemented, in one embodiment, by step 9004 of FIG. 9C. However, step 1004 is well-suited to the alternative methods for determining a performance level of a finger mentioned for step 9004. Outputs from step 1004 include signal-strength 1004a and time period 1004b over which signal-strength 1004a exists. Outputs 1004a and 1004b can be implemented using the embodiments and alternatives provided in FIGS. 6 through 9C. Output 1004b of time period provides a useful tool for evaluating the duration of fading on the signal-strength of a finger assignment. This, in turn, allows the present invention to provide adaptive combining of the finger assignment based on the time and signal-strength thresholds. Following step 1004, process 1000 proceeds to step 1006.

In step 1006 of the present embodiment, the finger assignment is categorized into a state for a subsequent combine operation. Step 1002 includes, in one embodiment, inputs of signal-strength 1006a and time period 1006b over which the signal-strength exists. In another embodiment, a finger assignment can be categorized into a state depending only upon multiple signal-strength thresholds. In another embodiment, a finger can be categorized into a state depending upon an additional threshold of time. Step 1006 is implemented, in one embodiment, according to state diagrams 900a and 900b, shown in FIGS. 9A and 9B. The state machines are effectively implemented by state machines and/or software/firmware 710 portions of communication device 700. However, the present invention is well-suited to using alternative state diagrams, with a wide range of conditions used to determine a state change or a state maintenance for a given multipath signal. Step 1006 provides outputs of a lock state 1006c and a timer state 1006d. These outputs are implemented, in one embodiment, utilizing the state diagrams of FIGS. 9A and 9B, and utilizing the hardware 720 and software/firmware 710 portions of communication device 700 of FIG. 7. Following step 1006, process 1000 proceeds to step 1008.

In step 1008 of the present embodiment, the finger assignment is evaluated for a combination operation based upon its performance level. Step 1008 is implemented, in one embodiment, by evaluating the state in which the finger assignment has been categorized. The state is implicitly implemented using the finger combine indicator (FCI) flags, as described in FIG. 9C. This embodiment is implemented using hardware 720 and software/firmware portion 710 of communication device 700, as described for FIG. 7. The use of flag bits allows convenient and streamlined implementation of states for deciding on the combination operation for a given finger assignment. However, the present invention is well-suited to using an alternative method for implementing the decision to combine, lock, or deassign a finger assignment based on the multiple thresholds mentioned in the present embodiment. Following step 1008, process 1000 proceeds to step 1010.

In step 1010 of the present embodiment the states of a finger assignment are adaptively updated. Step 1010 is accomplished by the repeated implementation of process 9000c of FIG. 9C in a parallel or serial manner. The states can either be stored and updated in memory 716, or can be implemented by hardware, of communication device 700 of FIG. 7. Following step 1010, process 1000 ends.

While process 1000 of the present embodiment shows a specific sequence and quantity of steps, the present invention is suitable to alternative embodiments. For example, not all the steps provided for process 1000 are required for the present invention. And additional steps may be added to those presented. Likewise, the sequence of the steps can be modified depending upon the application. Furthermore, while process 1000 is shown as a single serial process, it can also be implemented as a continuous or parallel process.

Many of the instructions for the steps, and the data input and output from the steps of process 1000 can be implemented utilizing memory 716 and utilizing processor 714, as shown in FIG. 7. Memory storage 716 of the present embodiment can either be permanent, such as read only memory (ROM) 718b, or temporary memory such as random access memory (RAM) 718a. Memory 716 can also be any other type of memory storage, capable of containing program instructions, such as a hard drive, a CD ROM, or flash memory. Furthermore, processor 714 can either be a dedicated controller, an existing system processor, or it can be a dedicated digital signal processing (DSP) processor. Alternatively, the instructions can be implemented using some form of a state machine.

Figure 11:
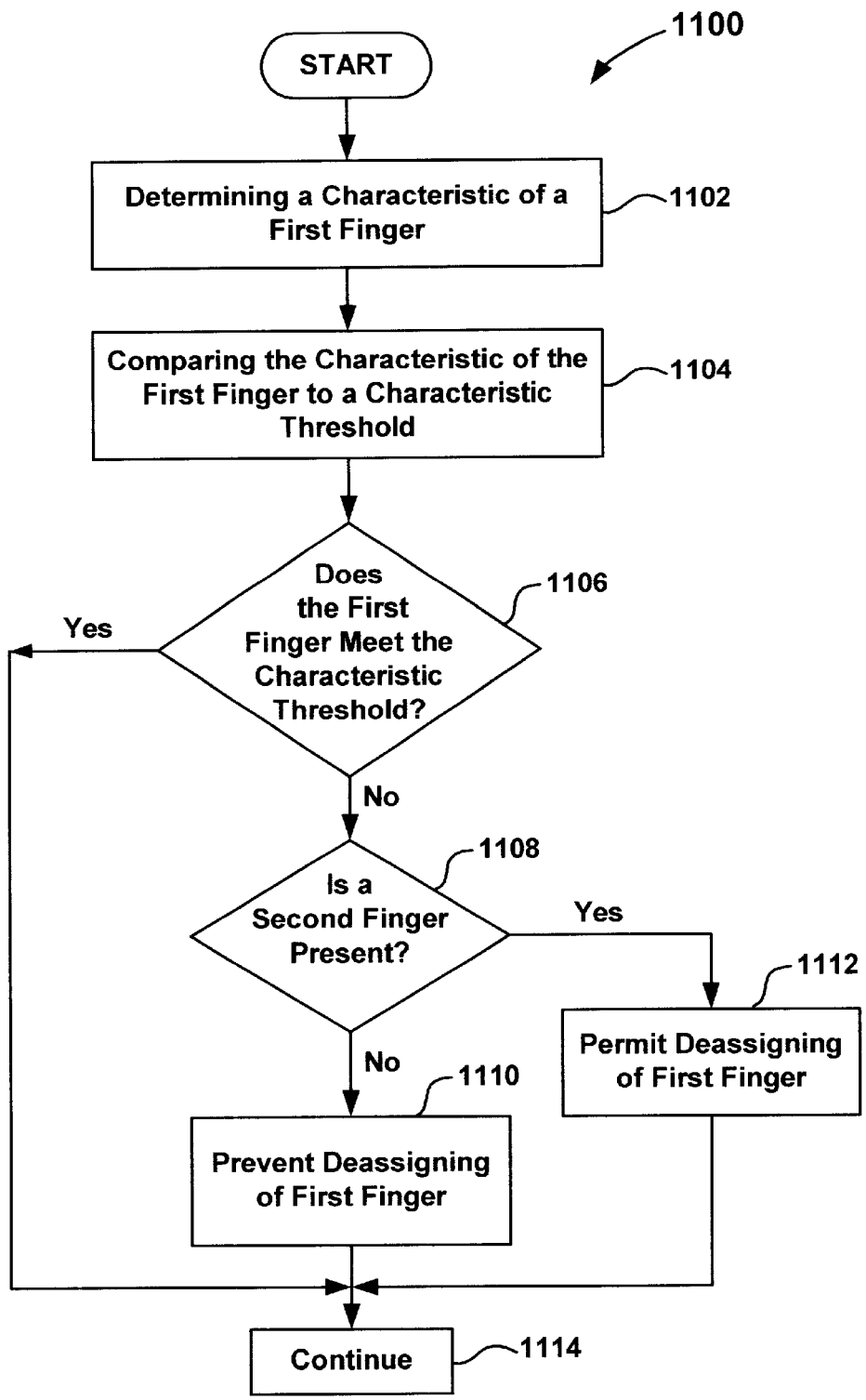
FIG. 11 is a flowchart of a process used for preventing dropped calls in a communication device, in accordance with one embodiment of the present invention.

With reference now to FIG. 11, a flow chart 1100 of steps performed in accordance with one embodiment of the present invention is shown. As described in detail above, in some embodiments of a communication device (e.g. a wireless telephone), multiple fingers are obtained by a searcher portion of a communication system. The communication system will then assign or deassign (e.g. drop fingers which do not meet a certain characteristic). For example, a finger which does not have a signal strength of a given threshold will be dropped. Similarly, a finger whose signal strength drops below a certain threshold for a given period of time may also be dropped. Such a procedure may not be suitable for all usage conditions. Specifically, during certain operating conditions (e.g. use in an urban canyon, use in a poorly serviced region, and the like) only a single finger may be obtained by the searcher portion. Under some conventional systems, the single finger is then evaluated to determine, for example, its signal strength. If the signal strength does not meet a certain value, the finger is deassigned (i.e. dropped). Unfortunately, when this one and only available finger is dropped, the communication link is also lost. As a result, the communication device "drops" the call which was relying on the single finger.

Referring again to FIG. 11, the present embodiment, as described in flow chart 1100 solves the above-described shortcomings of existing communication systems. The method of FIG. 1100 is well suited to be implemented in, for example, communication device 200 of FIG. 2. More specifically, in one embodiment, the present invention is comprised of computer readable code stored, for example, in memory 216, for causing communication device 200 to perform the steps described herein. The present invention is also well suited to being implemented in, for example, hardware such as an ASIC (application specific integrated circuit) which could then be added to communication device 200 of FIG. 2.

At step 1102, the present embodiment first determines a characteristic of a first finger. In one embodiment, the present invention determines the signal strength of a first finger. Although such a characteristic (i.e. signal strength) is mentioned in the above-described embodiment, the present invention is also well suited to embodiments in which various other characteristics are determined. Such other characteristics include, but are not limited to, duration of time a finger has a given signal strength, minimum and/or maximum signal strengths, number of times a finger falls below or rises above a particular signal strength level, and the like. Additionally, although the present example specifically recites determining a single characteristic of a finger, the present invention is also well suited to an embodiment in which more than one characteristic of the first finger is determined.

At step 1104, the present embodiment then compares the characteristic of the first finger to a characteristic threshold. For example, in one embodiment, the present invention compares the signal strength of the first finger to a minimal threshold value for signal strength.

Referring now to step 1106 of FIG. 11, the present embodiment then determines whether the characteristic determined at step 1102 for the first finger meets the characteristic threshold. If not, the present embodiment proceeds to step 1108. That is, if at step 1104 it is determined, for example, that the signal strength of the first finger is less than the threshold value (i.e. the characteristic of the first finger does not meet the characteristic threshold), the present invention proceeds to step 1108. If the first finger does meet the characteristic threshold, the present invention proceeds to step 1114 which is described below in detail.

At step 1108, the present invention determines whether a second finger is present. That is, the present invention determines whether the first finger is the only available finger. If a second finger is not present, the present invention proceeds to step 1110.

At step 1110, the present invention prevents the first finger from being deassigned. That is, in the present embodiment if the first finger is the only finger available, the present embodiment prevents the first finger from being deassigned even when the first finger does not meet the characteristic threshold. As a result, the present embodiment prevents the above-described problem wherein the only available finger is dropped, thereby losing the communication link, and causing the communication device to "drop" the call which was relying on the single finger. Hence, the present invention does not deassign a finger based solely upon a comparison to a threshold value. Instead, the present invention first determines whether a second finger is available before dropping the first finger. Thus, the present embodiment eliminates one of the causes of dropped calls in communication devices.

Referring again to step 1106, if the first finger does meet the characteristic threshold, the present invention will proceeds to step 1114. At step 1114, in one embodiment, the present invention continues with conventional communication steps. Such steps include combining of available fingers, and eventual production of an audible communication signal.

Referring again to step 1112, if at step 1108, a second finger is present, the present embodiment permits the first finger to be deassigned and then continues to step 1114.

Thus, an apparatus and a method which improves the capacity, fidelity, and performance of digital communication is provided. Specifically, in one embodiment, the present invention provides a method and apparatus which does not deassign a finger based solely upon a comparison to a threshold value. The present embodiment further provides a method and apparatus which achieves the above accomplishments and which prevents a communication linked from being dropped.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of preventing dropped calls in a wireless communication device, said method comprising the steps of:

a) determining a characteristic of a first finger;

b) comparing said characteristic of said first finger to a characteristic threshold;

c) when said characteristic of said first finger does not meet said characteristic threshold, determining if a second finger is present; and d) provided at step c) it is determined that said second finger is not present, preventing said first finger from being deassigned such that said first finger is not deassigned when only said first finger is present and such that said first finger is utilized even when said first finger does not meet said characteristic threshold.

2. The method recited in claim 1 wherein step b) comprises comparing said first finger to a time threshold characteristic.

3. The method recited in claim 1 wherein step b) comprises comparing said first finger to a signal strength threshold characteristic.

4. The method recited in claim 1 further comprising the step of:

e) provided at step c) it is determined that said second finger is present and that said second finger meets said characteristic threshold, deassigning said first finger such that said first finger is not utilized.

5. The method recited in claim 1 further comprising the step of:

e) provided at step c) it is determined that said second finger is not present, and after performing step d) utilizing said first finger in a communication link.

6. A wireless communication device adapted to prevent dropped calls, said wireless communication device comprising:

a searcher adapted to scan for multipath signals;

a transceiver coupled to said searcher;

a processor, said processor coupled to said searcher; and a computer readable memory unit, said computer readable memory unit coupled to said processor, said computer readable memory unit containing program instructions stored therein that execute, via said processor, and cause the processor to perform the steps of:

a) determining a signal-strength for a first finger;

b) comparing said signal strength of said first finger to a minimum threshold;

c) when said signal strength of said first finger does not meet said minimum threshold, determining if a second finger is present; and d) provided at step c) it is determined that said second finger is not present, preventing said first finger from being deassigned such that said first finger is not deassigned when only said first finger is present.

7. The method recited in claim 6 wherein step b) comprises comparing said first finger to a time threshold characteristic.

8. The method recited in claim 6 wherein step b) comprises comparing said first finger to a signal strength threshold characteristic.

9. The method recited in claim 6 further comprising the step of:

e) provided at step c) it is determined that said second finger is present and that said second finger meets said minimum threshold, deassigning said first finger such that said first finger is not utilized.

10. The method recited in claim 6 further comprising the step of:

e) provided at step c) it is determined that said second finger is not present, and after performing step d) utilizing said first finger in a communication link.

11. A computer readable medium containing therein computer readable codes for causing a communication device to implement a method of preventing dropped calls, said method comprising the steps of:

a) determining a signal-strength for a first finger;

b) comparing said signal strength of said first finger to a minimum threshold;

c) when said signal strength of said first finger does not meet said minimum threshold, determining if a second finger is present; and d) provided at step c) it is determined that said second finger is not present, preventing said first finger from being deassigned such that said first finger is not deassigned when only said first finger is present.

12. The method recited in claim 11 wherein step b) comprises comparing said first finger to a time threshold characteristic.

13. The method recited in claim 11 wherein step b) comprises comparing said first finger to a signal strength threshold characteristic.

14. The method recited in claim 11 further comprising the step of:

e) provided at step c) it is determined that said second finger is present and that said second finger meets said minimum threshold, deassigning said first finger such that said first finger is not utilized.

15. The method recited in claim 11 further comprising the step of:

e) provided at step c) it is determined that said second finger is not present, and after performing step d) utilizing said first finger in a communication link.

* * * * *